United States Patent [19]

Maeda et al.

[11] Patent Number: 5,447,562
[45] Date of Patent: Sep. 5, 1995

[54] INK, INK-JET RECORDING METHOD MAKING USE OF THE INK, INSTRUMENT PROVIDED WITH THE INK AND PRODUCTION METHOD OF THE INK

[75] Inventors: Hiroyuki Maeda; Akihiro Tanaka; Tokuya Ohta, all of Yokohama; Isao Kimura, Kawasaki, all of Japan

[73] Assignee: Canon Kabushiki Kaisha, Tokyo, Japan

[21] Appl. No.: 219,170

[22] Filed: Mar. 28, 1994

[30] Foreign Application Priority Data

Mar. 30, 1993 [JP] Japan .................. 5-071843
May 21, 1993 [JP] Japan .................. 5-119849
Oct. 6, 1993 [JP] Japan .................. 5-250636

[51] Int. Cl.6 .................................. C09D 11/02
[52] U.S. Cl. ..................... 106/20 R; 106/20 D; 106/22 R
[58] Field of Search ............. 106/20 R, 22 R, 20 D

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,517,244 | 5/1985 | Kobayashi et al. | 428/342 |
| 4,558,333 | 12/1985 | Sugitani et al. | 346/140 R |
| 4,655,834 | 4/1987 | Haruta et al. | 106/20 |
| 4,655,835 | 4/1987 | Haruta et al. | 106/20 |
| 4,683,002 | 7/1987 | Mirua et al. | 106/20 |
| 4,723,129 | 2/1988 | Endo et al. | 346/1.1 |
| 4,740,796 | 4/1988 | Endo et al. | 346/1.1 |
| 5,165,968 | 11/1992 | Johnson et al. | 427/288 |

FOREIGN PATENT DOCUMENTS

| | | |
|---|---|---|
| 0178095 | 4/1986 | European Pat. Off. |
| 3508389 | 9/1986 | Germany |
| 59-123670 | 7/1984 | Japan |
| 59-138461 | 8/1984 | Japan |

*Primary Examiner*—Helene Klemanski
*Attorney, Agent, or Firm*—Fitzpatrick, Cella, Harper & Scinto

[57] ABSTRACT

Disclosed herein is an ink comprising a coloring material and a liquid medium, wherein the liquid medium comprises a solvent containing clusters composed of 1 to 10 molecules.

40 Claims, 25 Drawing Sheets

DROPLET EJECTING DIRECTION

DROPLET EJECTING DIRECTION

DROPLET EJECTING
DIRECTION

DROPLET EJECTING
DIRECTION

DROPLET EJECTING
DIRECTION

DROPLET EJECTING
DIRECTION

DROPLET EJECTING
DIRECTION

DROPLET EJECTING
DIRECTION

DROPLET EJECTING DIRECTION

DROPLET EJECTING DIRECTION

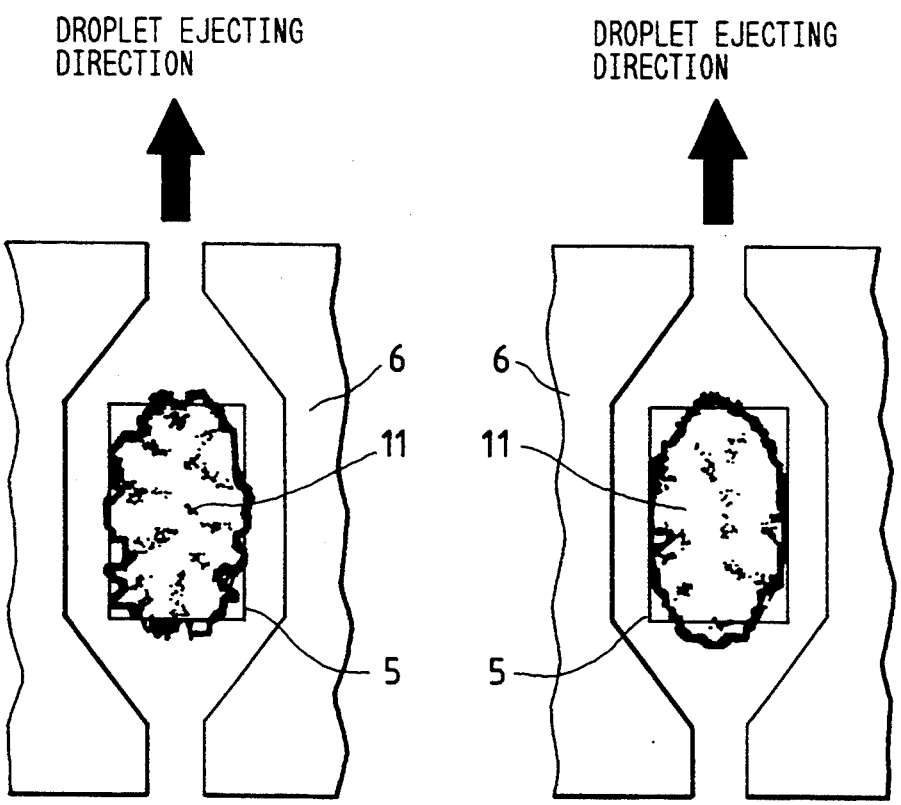

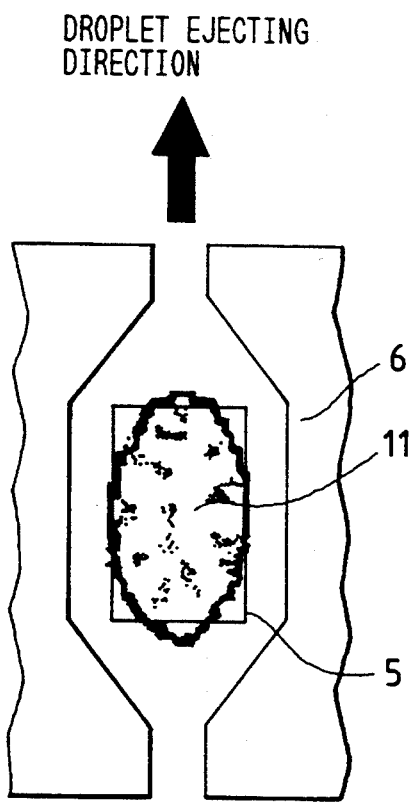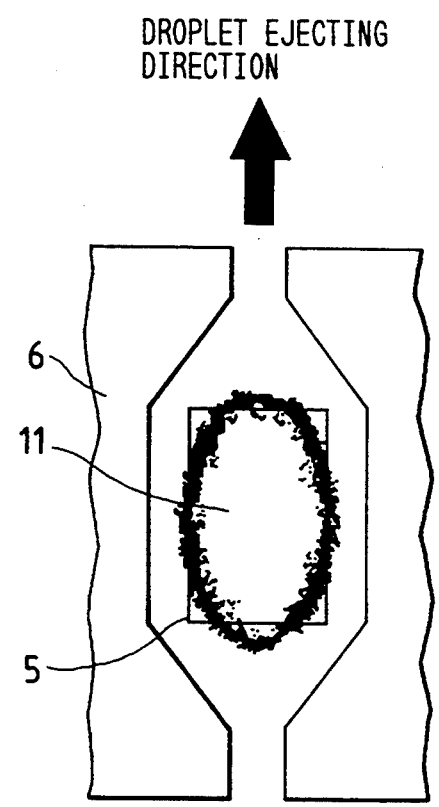

DROPLET EJECTING
DIRECTION

DROPLET EJECTING
DIRECTION

DROPLET EJECTING
DIRECTION

DROPLET EJECTING
DIRECTION

— (a) OFF-STATE OF ULTRASONIC WAVE-GENERATING ELEMENT
— (b) ON-STATE OF ULTRASONIC WAVE-GENERATING ELEMENT

— (a) OFF-STATE OF ULTRASONIC WAVE-GENERATING ELEMENT
— (b) ON-STATE OF ULTRASONIC WAVE-GENERATING ELEMENT

INK, INK-JET RECORDING METHOD MAKING USE OF THE INK, INSTRUMENT PROVIDED WITH THE INK AND PRODUCTION METHOD OF THE INK

BACKGROUND OF THE INVENTION

1. Field of the Invention

The present invention relates to an ink especially suitable for use in ink-jet printers, and more particularly, to an ink suitable for use in conduct recording by flying the ink out of an orifice of a recording head by the action of thermal energy, an ink-jet recording method and instruments making use of such an ink.

The present invention also relates to an ink excellent in ejection stability and a production method thereof.

This invention further relates to a method of stabilizing the fly of ink droplets.

2. Related Background Art

An ink-jet recording method is a recording method in which recording is conducted by forming flying droplets of an ink by one of various systems and applying the droplets to a recording material such as paper.

An ink-jet recording apparatus in which this kind of recording method is adopted can conduct high-speed printing and high-density recording with low noises. In addition, the apparatus itself can be miniaturized because treatments such as development and fixing are unnecessary to plain paper, and is good in productivity upon mass production and produced inexpensively. Therefore, such an apparatus has attracted special attention.

In particular, an On-Demand type ink-jet recording apparatus does not require a high-voltage generating device and a useless-ink recovering device, which are said to be necessary to a continuous type ink-jet recording apparatus, and hence can be miniaturized. Therefore, its application is promising.

In particular, an ink-jet recording apparatus making use of an ink-jet recording head described in Japanese Patent Publication No. 61-59914, in which a part of a liquid flow path filled with a liquid is heated to cause the liquid to undergo pressure change attendant on volume increase by rapid bubbling, thereby forming flying droplets of the liquid to be ejected from an orifice communicating with the liquid flow path, and the droplets are than applied to a recording material to make a record thereon, has attracted attention because it has such advantages that since formation of a high-density multi-orifice in the ink-jet recording head can be realized with ease, printing speed can be enhanced by making the head longer, and high-quality images can be provided.

In the ink-jet recording head making good use of thermal energy for forming the flying droplets, a means for heating an ink generally is equipped with an electro-thermal converter comprising a heating resistor capable of generating heat by applying an electric signal to heat the ink and an electrode for applying the electric signal to the heating resistor (hereinafter may referred to as heater).

The heater and electrode are formed by using a semiconductor process. For example, a wiring (electrode) formed of a metal (for example, Al, Au, Ag, Cu or the like), which is an electric conductor, is laminated on a heating resistor (made of a heat-resistant resistor material such as $HfB_2$, $ZrB_2$, $TaN_2$ or $TaSi$) provided on a base (for example, Si, glass, ceramic or the like) in such a manner that portions of the intermediate layer are exposed, thereby forming the heater and electrode. Namely, the exposed portions of the intermediate layer serve as a heater. In order to prevent electrolytic corrosion and oxidation by the ink, a protective film excellent in heat resistance and ink-barrier properties, or the like is further provided on at least the heater and the electrode as needed.

In the ink-jet recording method in which the heater is energized repeatedly by electric signals according to recording signals to generate heat at a high temperature, thereby heating the ink to eject droplets of the ink, the evenness of the ejection volume and ejection velocity of the ink droplets ejected according to the recording signals, i.e., the stability of recording properties of the ejected droplets, is related to the stability of image quality at a high level upon recording even under any conditions (for example, high frequency). Therefore, developments have heretofore been conducted paying attention to how to always stabilize the recording properties of an ink droplet ejected according to every recording signal even under any conditions to permit keeping the quality of recorded images at a high level.

In order to always stabilize the recording properties of the ink droplet ejected according to every recording signal to keep the quality of recorded images at a high level, it is necessary to always keep the size and shape of a bubble generated on the heater according to every recording signal uniform.

However, it has been very difficult to always keep the size and shape of the bubble generated on the heater according to every recording signal uniform even under any conditions. It has been almost impossible to achieve this by the conventional inks.

SUMMARY OF THE INVENTION

The present invention has thus been completed with the foregoing circumstances in view and has as an object the provision of an ink, which always permits the stabilization of recording properties of an ink droplet ejected according to every recording signal to keep the quality of recorded images at a high level, a production method thereof, and an ink-jet recording method and instruments making use of such an ink.

It is another object of the present invention to provide a method of stably ejecting droplets of an ink.

The above objects can be achieved by the present invention described below.

According to the present invention, there is thus provided an ink comprising a coloring material and a liquid medium, wherein the liquid medium comprises a solvent containing clusters composed of 1 to 10 molecules.

According to the present invention, there is also provided a method of stabilizing flying of droplets of an ink, wherein upon flying out the ink droplets by the action of thermal energy to conduct recording, the ink described above is used as said ink.

According to the present invention, there is further provided an ink-jet recording method comprising flying out droplets of an ink by the action of thermal energy to conduct recording, wherein the ink described above is used as said ink.

According to the present invention, there is still further provided a method of producing an ink comprising a coloring material and a liquid medium, wherein a solvent containing clusters composed of 1 to 10 molecules is used in the liquid medium.

According to the present invention, there is yet still further provided a recording head comprising an ink container portion with an ink held therein, and a head from which the ink is ejected in the form of ink droplets by the action of thermal energy, wherein said ink is the ink described above.

According to the present invention, there is yet still further provided an ink-jet recording apparatus equipped with the recording head described above.

According to the present invention, there is yet still further provided a recording head comprising an ink container portion with an ink held therein, and a head for ejecting the ink in the form of ink droplets from its ejection orifice by the action of thermal energy, wherein an ink comprising a coloring material and a liquid medium the molecules of which are dispersed by making the bonding state of the molecules microscopically uniform is used as said ink, and a means for keeping the dispersed state of the liquid medium is provided in the head.

According to the present invention, there is yet still further provided an ink-jet recording apparatus equipped with the recording head described above.

According to the present invention, there is yet still further provided an ink-jet recording method comprising flying out droplets of an ink by the action of thermal energy to conduct recording, wherein an ink comprising a coloring material and a liquid medium the molecules of which are dispersed by making the bonding state of molecules microscopically uniform is used as said ink, and energy required to keep the dispersed state of the liquid medium is applied to the ink.

BRIEF DESCRIPTION OF THE DRAWING

FIGS. 12A and 12B are top views illustrating the bubbling state of inks on a heater in an ink flow path of the ink-jet recording head in a yet still further embodiment of the present invention.

FIGS. 14A and 14B are top views illustrating the bubbling state of inks on a heater in an ink flow path of the ink-jet recording head in a yet still further embodiment of the present inventions

DESCRIPTION OF THE PREFERRED EMBODIMENTS

Figure 1:
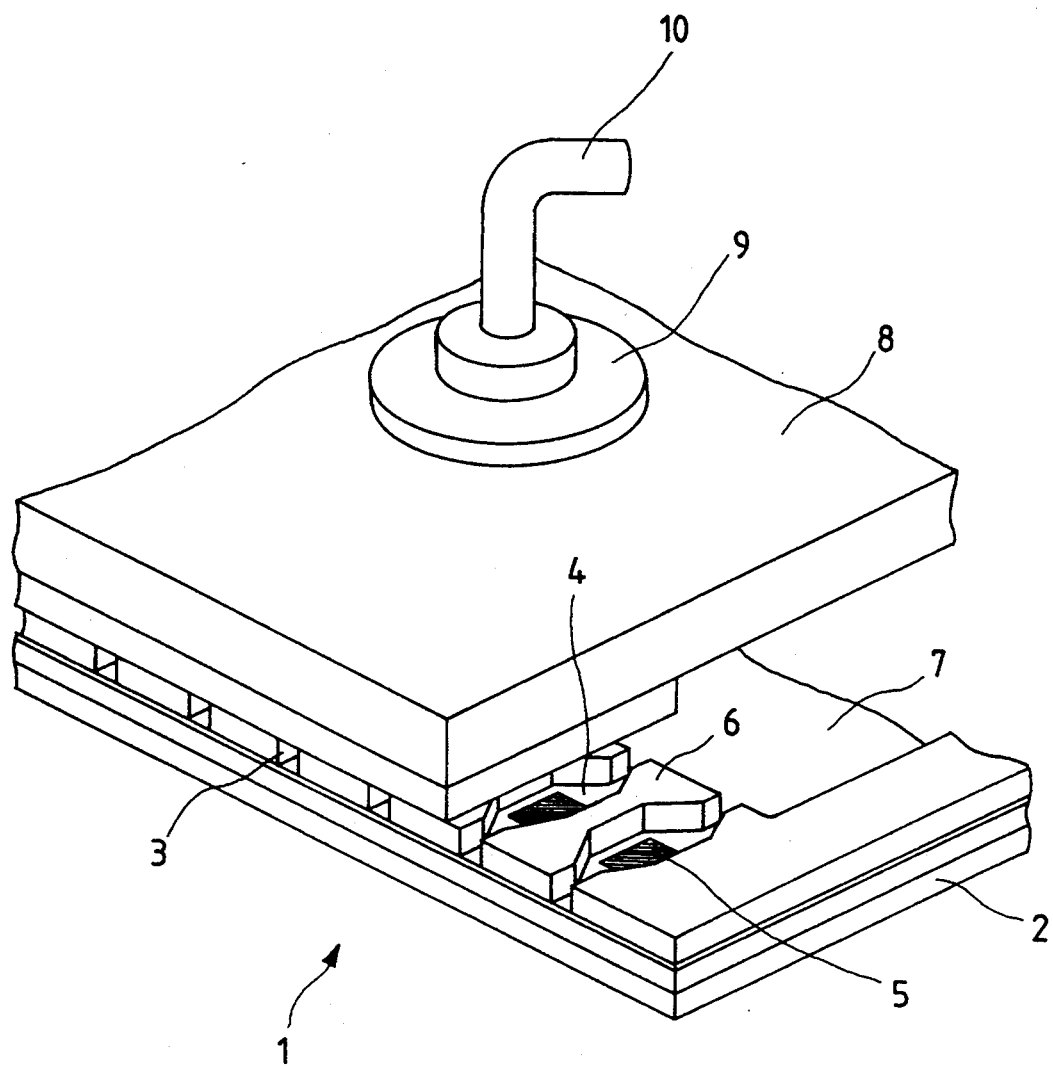
FIG. 1 is a schematic perspective view of an ink-jet recording head according to an embodiment of the present invention.

The present inventor has paid attention to the fact that in an ink caused to undergo change of state by thermal energy, a bubble formed by this change of state is mainly formed by evaporation due to the change of state of a liquid medium dissolving or dispersing a coloring material therein, and has carried out an investigation. As a result, it has been found that when an ink comprising a coloring material and a liquid medium comprising a solvent containing clusters composed of 1 to 10 molecules is used, a bubble formed on a heater according to every recording signal is always kept at uniform size and shape, thus leading to completion of the first aspect of the present invention.

In the first aspect of the present invention, the liquid medium comprising at least one solvent in which the number of molecules forming the cluster is not less than 1, but not more than 10, preferably not less than 3, but not more than 8 is used. Methods of controlling the number of molecules forming the cluster within a range of from 1 to 10 include means in which electric, magnetic or ultrasonic energy is applied to a solvent containing clusters, the whole of solvents or the whole ink, and the like, to which, however, are not limited so far as the number of molecules can be controlled within the range of from 1 to 10. As other means, may be mentioned those making use of far infrared radiation energy, shock wave energy, chemical energy, physical energy or the like. These means may be used either singly or in combination to control the number of molecules forming the cluster.

Many of inks used in ink-jet recording are aqueous, and the liquid medium is composed principally of water. In such an ink, a solvent containing clusters formed of a small number of molecules may be provided by using deionized water or electrolytic water as the water.

The number of molecules in a cluster can be determined by the measurement by a nuclear magnetic resonance absorption spectrophotometer (NMR) or the like.

In the second aspect of the present invention, a monohydric alcohol is added to an ink, and ultrasonic energy is applied to the ink. More specifically, the ultrasonic wave is an elastic wave. Therefore, when particles in a liquid medium are vigorously vibrated for a short period of time, hydrogen bond can be cut without cutting any chemical bond. Further, if gas is dissolved in the liquid medium, an effect of agitation is brought about by causing cavitation in the liquid medium by the above vigorous vibration. Using these tendencies, hydrogen bonds of the molecules of the monohydric alcohol and molecules such as water in the liquid medium in the ink are cut, and the ink is stirred to mutually diffuse the molecules, thereby making the bonding state of the molecules microscopically more uniform (i.e., forming clusters) to disperse them. Accordingly, the amount of the ultrasonic energy used in the second aspect of the present invention may be an amount sufficient to bring about at least the above effect though it may vary depending on the amounts and kinds of the monohydric alcohol and liquid medium to be used.

As the monohydric alcohol, may be used any alcohol of primary, secondary and tertiary alcohols. Examples thereof include methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 3-methyl-2-butanol, neopentyl alcohol and the like. It goes without saying that the monohydric alcohol is not limited to these alcohols.

The content of the monohydric alcohol in the ink is preferably 0.1 to 20.0% by weight based on the total weight of the ink. However, alcohols which are not soluble in water infinitely such as 2-butanol, isobutanol, 1-pentanol, 2-pentanol, 3-pentanol, 2-methyl-1-butanol, isopentyl alcohol, tert-pentyl alcohol, 3-methyl-2-butanol, neopentyl alcohol and the like are preferably used within a range that they are soluble in water. If the content of the alcohol is lower or higher than this range, the capability of mutually diffusing molecules of water and the like in the liquid medium upon application of the ultrasonic energy to make the bonding state of the molecules microscopically more uniform so as to disperse them is lowered though its degree may vary depending on the kind of the alcohol, and the kind of the liquid medium and the amount of water in the ink.

The inks according to the first and second aspects of the present invention comprise a coloring material such as a dye or pigment and a liquid medium dissolving or dispersing the coloring material therein.

Any known coloring material may be used as the coloring material, and examples thereof include water soluble dyes such as direct dyes, acid dyes, basic dyes, reactive dyes and food dyes, and water-insoluble coloring matter such as pigments and disperse dyes.

It is preferable to use such a coloring material in a proportion of, generally, from about 0.1% to 25% by weight based on the total weight of the ink.

As the liquid medium, may be used water and optionally, at least one water-soluble organic solvent. Examples of the water-soluble organic solvent include amides such as dimethylformamide and dimethylacetoamide, ketones such as acetone, ethers such as tetrahydrofuran and dioxane, polyalkylene glycols such as polyethylene glycol and polypropylene glycol, alkylene glycols such as ethylene glycol, propylene glycol, butylene glycol, triethylene glycol, thiodiglycol, hexylene glycol and diethylene glycol, lower alkyl ethers of polyhydric alcohols such as ethylene glycol methyl ether, diethylene glycol monomethyl ether and triethylene glycol monomethyl ether, monohydric alcohols such as ethanol and isopropyl alcohol, and besides, glycerol, 1,2,6-hexanetriol, 1,3-dimethyl-2-imidazolidinone, monoethanolamine, triethanolamine, sulfolane, dimethyl sulfoxide, and the like.

No particular limitation is imposed on the content of the water-soluble organic solvent in the ink. However, it may preferably be within a range of from 1 to 80% by weight based on the total weight of the ink.

The content of water in the ink is determined depending on the kind and composition of the solvent, and the like. However, it is preferably used within a range of from 10 to 99% by weight, more preferably from 15 to 98% by weight based on the total weight of the ink.

The inks according to the present invention may contain a variety of other additives such as dispersants, viscosity modifiers, pH adjustors, antiseptics, surfactants, antioxidants and evaporation-accelerating agents as needed. Specific examples thereof include viscosity modifiers such as polyvinyl alcohol, cellulose and derivatives thereof, and water-soluble resins; cationic, anionic or nonionic surfactants; surface tension modifiers such as diethanolamine and triethanolamine; pH adjustors such as buffers; mildewproofing agents; and the like.

Incidentally, the ink used in the second aspect of the present invention uses, as the water, that the molecules of which have been dispersed by making the bonding state of its molecules microscopically uniform. For example, the bonding state of the molecules is made microscopically uniform by a means in which electric energy, magnetic energy or ultrasonic energy is applied to water, or the like, namely, clusters are formed, thereby dispersing the molecules, to which, however, are not limited, and methods in which the bonding state of the molecules is made microscopically uniform to disperse the molecules are all included. As other means, may be mentioned those making use of far infrared radiation energy, shock wave energy, chemical energy, physical energy or the like. The deionized water and electrolytic water as described in the first aspect may preferably be used.

The thus-obtained inks according to the present invention are particularly suitable for use in an ink-jet recording system of a type that an ink is ejected by the action of thermal energy to conduct recording, and have an excellent effect in recording heads and recording apparatus, which are equipped with a means (for example, an electrothermal converter, laser or the like) for generating thermal energy as energy used for ejecting an ink, and in which the change of state of the ink is caused by the thermal energy. According to such a system, high-density and high-definition recording can be achieved.

With respect to its typical construction and principle, it is desirable to follow the basic principle disclosed, for example, in U.S. Pat. Nos. 4,723,129 and 4,740,796. This system may be used in both so-called On-Demand type and continuous type. However, it is effective to use this system in the On-Demand type because at least one drive signal according to recording information can be applied to an electrothermal converter disposed opposite to a sheet or liquid flow path with an ink held therein to rapidly raise the temperature of the ink beyond its nuclear boiling, thereby causing the electrothermal converter to generate thermal energy so as to cause film boiling on a thermal action surface of a recording head, so that a bubble can be formed in the ink according to every drive signal. By the growth and contraction of the bubble, the ink is ejected through an ejection orifice to form at least uniform droplets. If the drive signal is applied in the form of pulse, the growth and contraction of the bubble can be suitably conducted without delay. Therefore, the ejection of the ink can be achieved with excellent responsibility. Such a signal is hence more preferable. As the drive signal in the form of pulse, such signals as described in U.S. Pat. Nos. 4,463,359 and 4,345,262 are suitable. If the conditions described in U.S. Pat. No. 4,313,124 which is an invention relating to the rate of temperature rise are adopted, recording can be conducted with better results.

With respect to the construction of the recording head, the construction described in U.S. Pat. Nos. 4,558,333 or 4,459,600 which discloses, in addition to the combined construction of the ejection orifice, liquid flow path and electrothermal converter (linear liquid flow path or rectangular liquid flow path), construction, in which a thermal action part is disposed in a curved region, is also included in the present invention. In addition, if construction based on Japanese Patent Application Laid-Open No. 59-123670 which discloses construction in which a common slit to a plurality of electrothermal converters is used as ejection parts for the electrothermal converters and Japanese Patent Application Laid-Open No. 59-138461 which discloses construction in which an opening absorbing the pressure wave of thermal energy is provided opposite to an ejection part is adopted, the effects of the present invention are available. Namely, according to the present invention, recording can be conducted certainly and efficiently even if a recording head in any form is used.

In a serial type recording apparatus having the above-described ink flow path, the present invention is effective even in the case where a recording head fixed to the main body of the apparatus, a chip type recording head which permits an electrical connection to the main body of the apparatus and supply of an ink from the main body by installing it in the main body of the apparatus, or a cartridge type recording head in which an ink tank has been integrally provided in the recording head itself is used.

As components of the recording apparatus according to the present invention, an ejection-recovery means for the recording head, preliminary auxiliary means and the like may preferably be added because the effects of the present invention can be more stabilized. As specific examples thereof, may be mentioned capping means for the recording head, cleaning means, pressurizing or sucking means, preliminary heating means for conducting heating by means of an electrothermal converter or another heating elements or a combination thereof, and preliminary ejecting means for conducting another ejection than for recording.

With respect to the kind and number of recording heads to be mounted, either only one recording head for an ink of a single color or plural recording heads corresponding to plural inks different in recorded color and color depth may be provided. More specifically, the present invention is extremely effective in, for example, an apparatus having, as a recording mode of the recording apparatus, not only a recording mode of only a main color such as a black color, but at least one of recording modes such as a complex color of different colors and a full color by color mixing though either a recording head may be integrally constructed, or plural recording heads may be combined.

In addition, the ink-jet recording apparatus according to the present invention may be used in the form of image output terminals for information processing instruments such as computers, and besides copying machines combined with a reader or the like and facsimiles having a transmitter-receiver.

FIG. 1 is a perspective view of an illustrative ink-jet recording head suitable for use in recording with the ink according to the first aspect of the present invention. The recording head 1 comprises a head base 2, and a common chamber 7 for a recording liquid (hereinafter called common ink chamber), flow paths 4 for the recording liquid (hereinafter called ink flow paths) communicating with the common ink chamber 7, walls 6 of the recording liquid flow paths (hereinafter called ink flow path walls) defining the ink flow paths 4, ejection orifices 3 for ejecting the recording liquid (hereinafter called ink) in the ink flow paths 4, heaters 5 provided in the respective ink flow paths 4 and an electric wiring (not shown) for energizing the respective heaters 5, which are all provided on the base 2. The recording head 1 is constructed by laying a top plate 8 on top of the above components. In order to conduct recording using the head 1, an ink is first filled in the ink flow paths 4 from the common ink chamber 7. A recording electric signal is then applied to the heater 5 required for printing. The heater 5 thus generates heat, whereby thermal energy is applied to an ink portion existing in the ink flow path 4 in the vicinity of the heater 5. The thermal energy is applied to the ink portion from the heater in such a manner, whereby a bubble is formed in the ink flow path 4 in association with the momentary volume increase of the ink in that region. An ink portion existing on the downstream side of the heater 5 (on the side of the ejection orifice 3) is thus ejected through the ejection orifice 3, thereby forming a flying droplet (not shown) of the ink. The ink droplet is applied to a recording material (not shown) such as paper fed in front of the recording head 1, thereby recording a desired image.

An illustrative ink-jet recording head preferably used in the first and second aspects of the present invention will be described with reference to FIG. 20.

The recording head 21 comprises a head base 22, and a common ink chamber 27, ink flow paths 24 communicating with the common ink chamber 27, walls 26 of the ink flow paths defining the ink flow paths 24, ejection orifices 23 for ejecting an ink in the ink flow paths 24, heaters 25 provided in the respective ink flow paths 24, an ultrasonic wave-generating element 29 provided in the common ink chamber 27 as a means for keeping the properties of the ink and an electric wiring (not shown) for energizing the respective heaters 25 and the ultrasonic wave-generating element 29, which are all provided on the base 22. The recording head 21 is constructed by laying a top plate 28 on top of the above components. In order to conduct recording using the recording head 21, an ink is first filled in the ink flow paths 24 from the common ink chamber 27. A recording electric signal is then applied to the heater 25 required for printing. The heater 25 thus generates heat, whereby thermal energy is applied to an ink portion existing in the ink flow path 24 in the vicinity of the heater 25. The thermal energy is applied to the ink portion from the heater in such a manner, whereby a bubble is formed in the ink flow path 24 in association with the momentary volume increase of the ink in that region (not illustrated). An ink portion existing on the downstream side of the heater 25 (on the side of the ejection orifice 23) is thus ejected through the ejection orifice 23, thereby forming a flying droplet (not shown) of the ink. The ink droplet is applied to a recording material (not shown) such as paper fed in front of the recording head 21, thereby recording a desired image.

Figure 20:
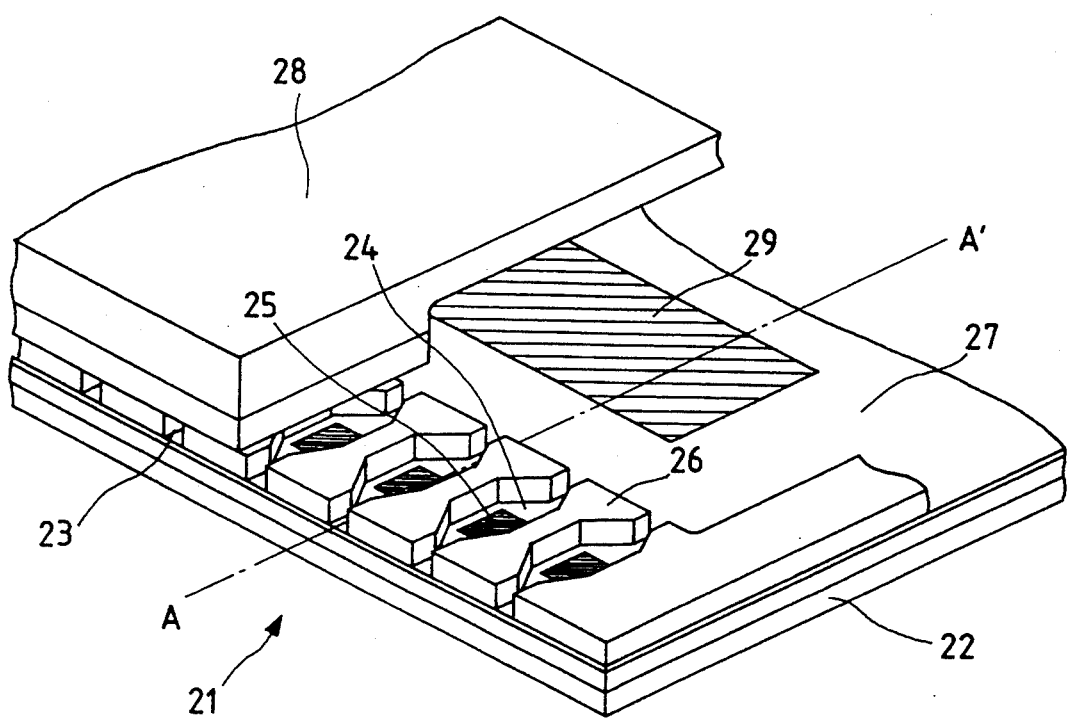
FIG. 20 is a schematic perspective view of an ink-jet recording head according to another embodiment of the present invention.
Figure 21:
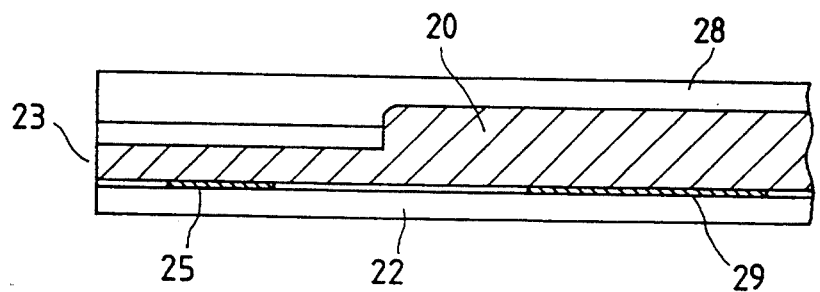
FIG. 21 is a schematic cross-sectional view of the recording head illustrated in FIG. 20.

FIG. 21 is a schematic cross-sectional view of the recording head 1 taken along line A-A' of FIG. 20. In FIG. 21, an ink 20 is filled in common ink chamber 27 and the ink flow path 24.

No particular limitation is imposed on the means for keeping the properties of the inks according to the present invention so far as it can keep the properties of the inks. However, an ultrasonic wave-generating element is preferred from the viewpoint of the handling.

Figure 26:
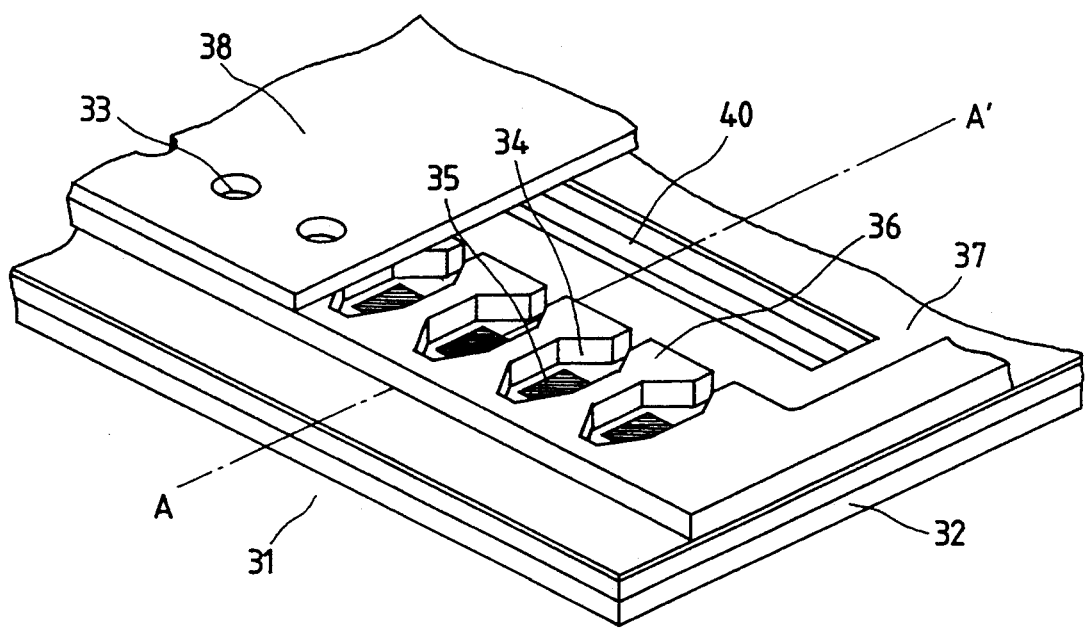
FIG. 26 is a schematic perspective view of an ink-jet recording head according to a further embodiment of the present invention.

FIG. 26 is a perspective view of another illustrative ink-jet recording head preferably used in the first and second aspects of the present invention. The recording head 31 comprises a head base 32, and a common ink chamber 37, ink flow paths 34 communicating with the common ink chamber 37, walls 36 of the ink flow paths defining the ink flow paths 34, heaters 35 provided in the respective ink flow paths 34, an ink feed opening 40 provided in the common ink chamber 37 and an electric wiring (not shown) for energizing the respective heaters 35, which are all provided on the base 32. The recording head 1 is constructed by laying an orifice plate 38 on top of the above components to provide ejection orifices 33 for ejecting an ink in the ink flow path 34. In order to conduct recording using the recording head 31, it is only necessary to conduct recording in substantially the same manner as the recording process making use of the recording head 1.

Figure 27:
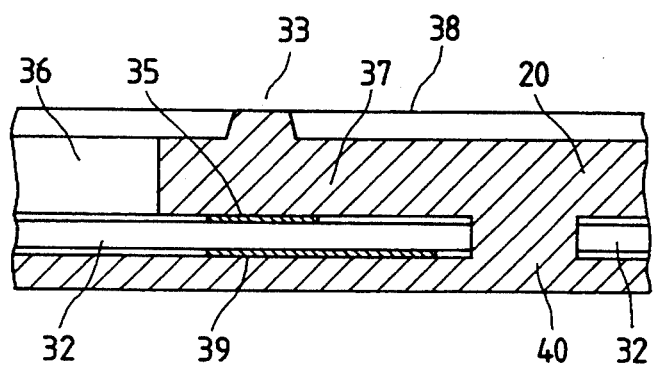
FIG. 27 is a schematic cross-sectional view of the recording head illustrated in FIG. 26.

FIG. 27 is a schematic cross-sectional view of the recording head 31 taken along line A-A' of FIG. 26. In FIG. 27, an ink 20 is filled in the common ink chamber 37 and the ink flow path 34. The common ink chamber 37 communicates with an ink tank (not shown) by the ink feed opening 40. In this recording head, an ultrasonic wave-generating element 39 is provided on the opposite side of the heater 35 through the head base 32.

The recording heads according to the present invention feature that the ultrasonic wave-generating element is provided in any portion of its ink-holding region, but are not limited to the above construction.

An illustrative ink-jet recording apparatus in which such a head has been incorporated.

Figure 30:
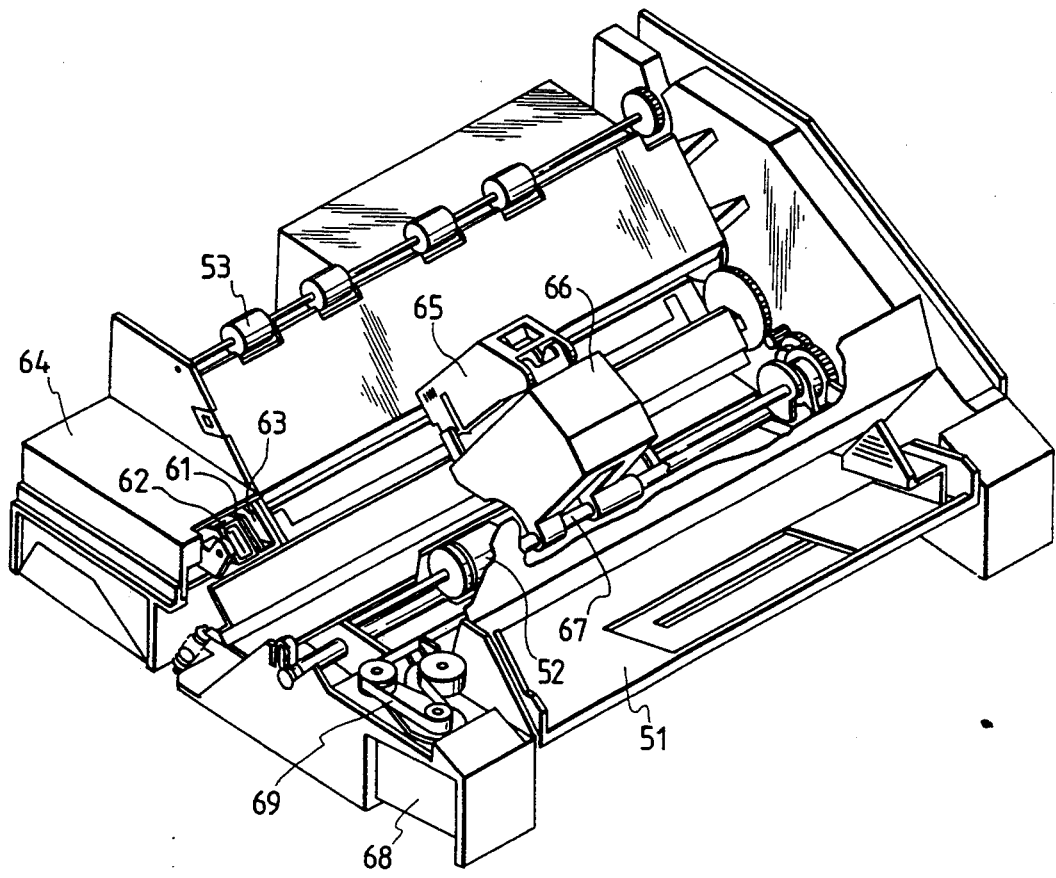
FIG. 30 is a perspective view of an ink-jet recording apparatus in which a recording head has been incorporated.

In FIG. 30, reference numeral 61 designates a blade serving as a wiping member, one end of which is a stationary end held by a blade-holding member to form a cantilever. The blade 61 is provided at a position adjacent to a region in which a recording head operates, and is held in such a form that it protrudes to the course through which the recording head is moved. Reference numeral 62 indicates a cap, which is provided at a home position adjacent to the blade 61, and is so constituted that it moves in a direction perpendicular to a direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved. The above-described blade 61, cap 62 and absorbing member 63 constitute an ejection-recovery portion 64 for the recording head, where the blade 61 and the absorbing member 63 remove off water, dust and/or the like from the face of the ink-ejecting openings.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

The present invention will hereinafter be specifically described in detail by the following examples. Incidentally, all designations of "part" or "parts" as will be used in the following examples mean part or parts by weight unless expressly noted.

EXAMPLE 1

| Ink-1: | |
| --- | --- |
| Diethylene glycol | 10.0 parts |
| Glycerol | 10.0 parts |
| Water | 77.5 parts. |

The above solvents were mixed under stirring, to which electric energy was applied. The following coloring material was then added to the mixture, and they were further mixed under stirring to prepare Ink-1.

| C.I. Direct Black 19 | 2.5 parts. |
| --- | --- |

Ink-2 was prepared in the same manner as in Ink-1 except that no electric energy was applied to the same solvents as those used in Ink-1.

Each of Ink-1 and Ink-2 obtained by mixing the respective components was charged in the ink-jet recording head illustrated in FIG. 1 and then a recording signal was applied to the heater 5, thereby observing a bubble 11 formed on the heater 5 (hereinafter referred to as bubbling state) from above the heater 5. As a result, the bubbling state for Ink-1 and the bubbling state for Ink-2 as illustrated in FIGS. 2A and 2B, respectively, were observed.

Figure 2A:
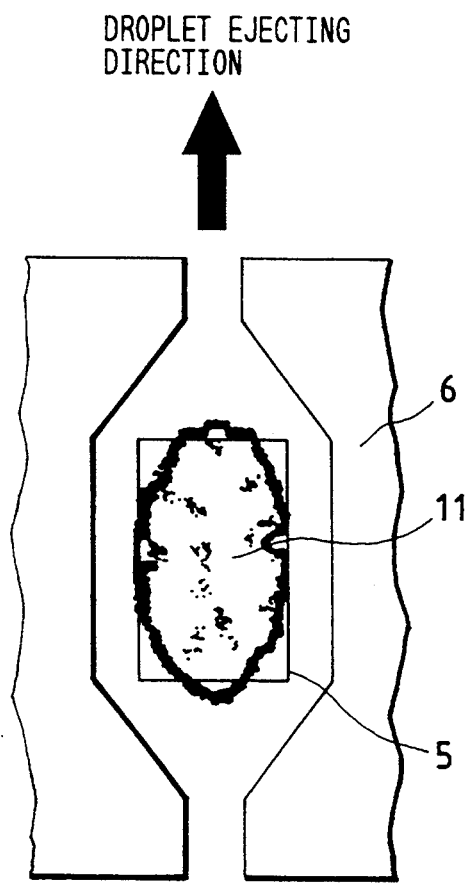
FIGS. 2A and 2B are top views illustrating the bubbling state of inks on a heater in an ink flow path of the ink-jet recording head in an embodiment of the present invention.
Figure 2B:
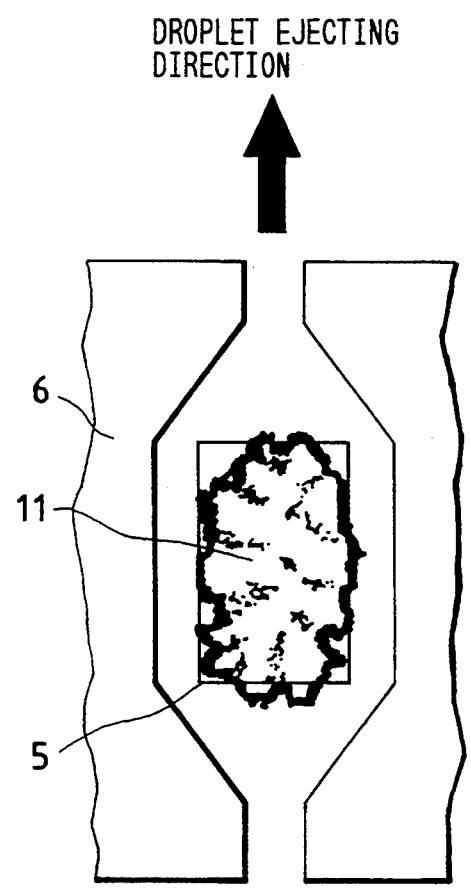

The bubbling states shown in FIGS. 2A and 2B are observational results at the time the shape of the bubble formed after applying the recording signal to the heater 5 has become the biggest. From the comparison of the bubbling state for Ink-1 shown in FIG. 2A with the bubbling state for Ink-2 shown in FIG. 2B, it was found that the shape of the bubble formed in the bubbling state for Ink-1 is stabler than that in the bubbling state for Ink-2. With respect to these bubbling states, the recording properties, i.e., ejection velocity and ejection volume of the ink droplet, become stabler values as the shape and size of the bubble formed according to every recording signal are more uniform, which in its turn permits the stabilization of quality of recorded images at a high level.

Figure 3A:
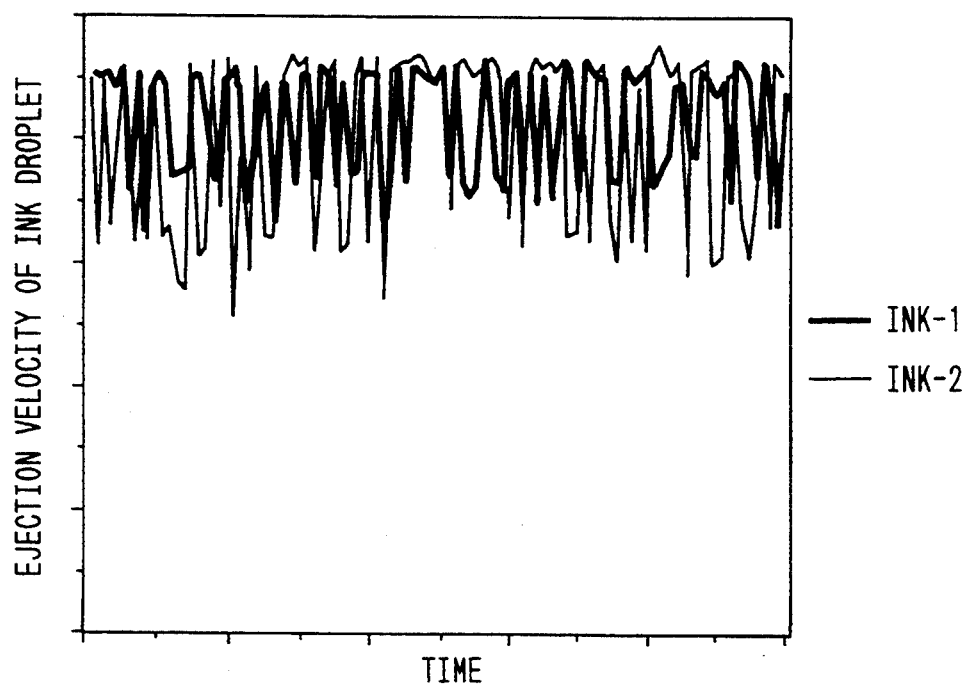
FIGS. 3A and 3B are graphs illustrating the measurement results of recording properties of the inks in the ink-jet recording head in the embodiment of the present invention.
Figure 3B:
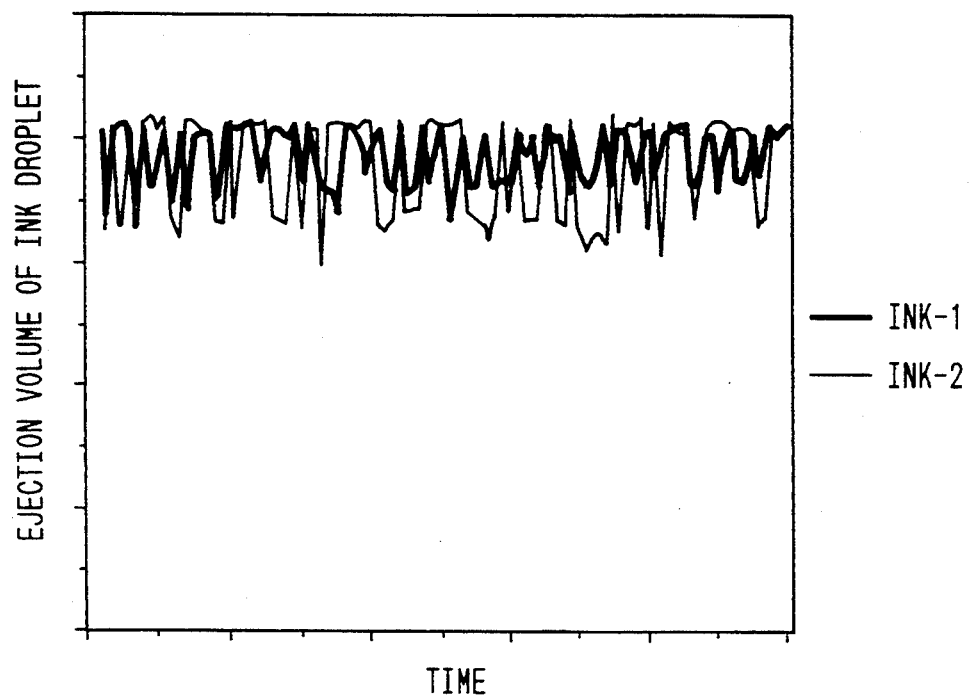

Using these inks, their recording properties, i.e., the ejection velocity and ejection volume of ink droplets ejected, were then measured. As a result, the results as to the ejection velocity of the ink droplets and the ejection volume of the ink droplets with the passage of time as illustrated in FIGS. 3A and 3B, respectively, were obtained. It was found from the results that Ink-1 is narrower in scattering of measured values on both ejection velocity of the ink droplets and ejection volume of the ink droplets than Ink-2.

Namely, it was found that Ink-1 is stabler in recording properties than Ink-2.

On the other hand, the determination of water contained in Ink-1 and Ink-2 was conducted by NMR. As a result, the number of molecules forming a cluster of water in Ink-1 was found to be 10, while the number of molecules forming a cluster of water in Ink-2 was 13.

From the above, it was able to be confirmed that when the number of molecules forming a cluster of water is controlled to 10 or less by applying electric energy, the size and shape of the bubble formed on the heater can be stabilized, and stable recording properties can hence be always provided.

EXAMPLE 2

Ink-3 was prepared in the same manner as in Ink-1 except that the same solvents as those used in Ink-1 were mixed, to which electric energy was applied, and magnetic energy was further applied to the thus-treated mixture.

Each of Ink-1 and Ink-3 was charged in the ink-jet recording head illustrated in FIG. 1 and then a recording signal was applied to the heater 5, thereby observing the bubbling state of the ink on the heater 5 from above the heater 5. As a result, the bubbling state for Ink-1 and the bubbling state for Ink-3 as illustrated in FIGS. 4A and 4B, respectively, were observed.

Figure 4A:
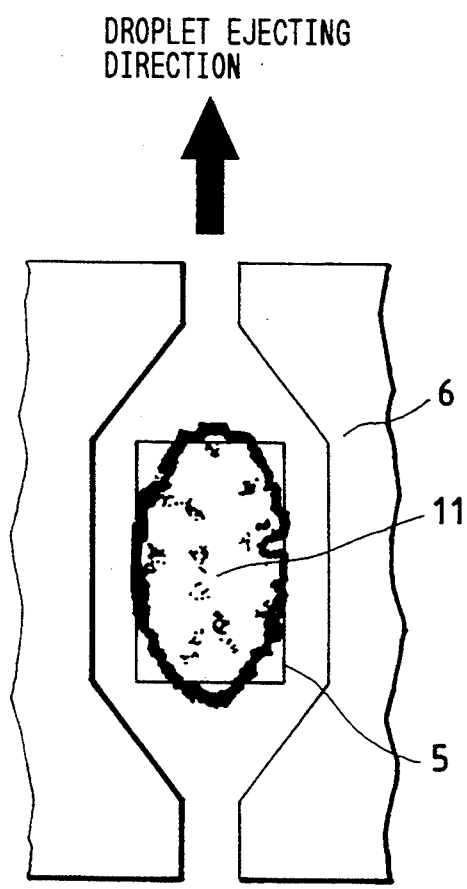
FIGS. 4A and 4B are top views illustrating the bubbling state of inks on a heater in an ink flow path of the ink-jet recording head in another embodiment of the present invention.
Figure 4B:
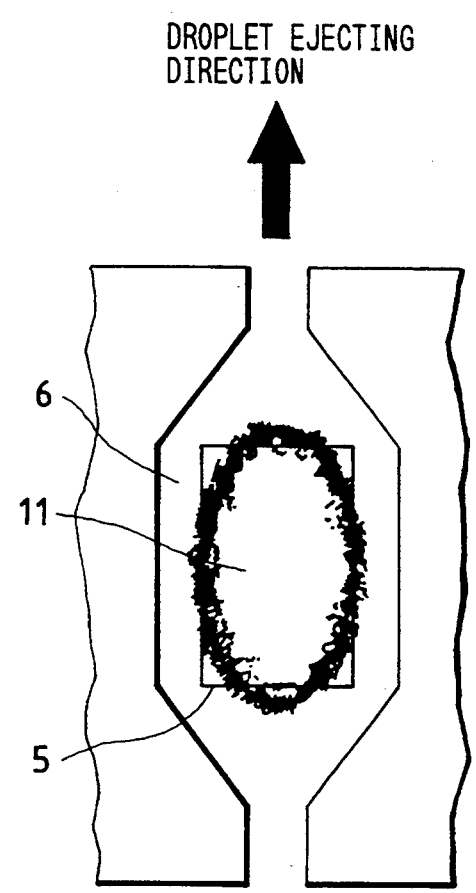

In the drawings, the bubbling states shown in FIGS. 4A and 4B are observational results at the time the shape of the bubble formed after applying the recording signal to the heater 5 has become the biggest. From the comparison of the bubbling state for Ink-1 shown in FIG. 4A with the bubbling state for Ink-3 shown in FIG. 4B, it was found that the shape of the bubble formed in the bubbling state for Ink-3 is still stabler than that in the bubbling state for Ink-1.

Figure 5A:
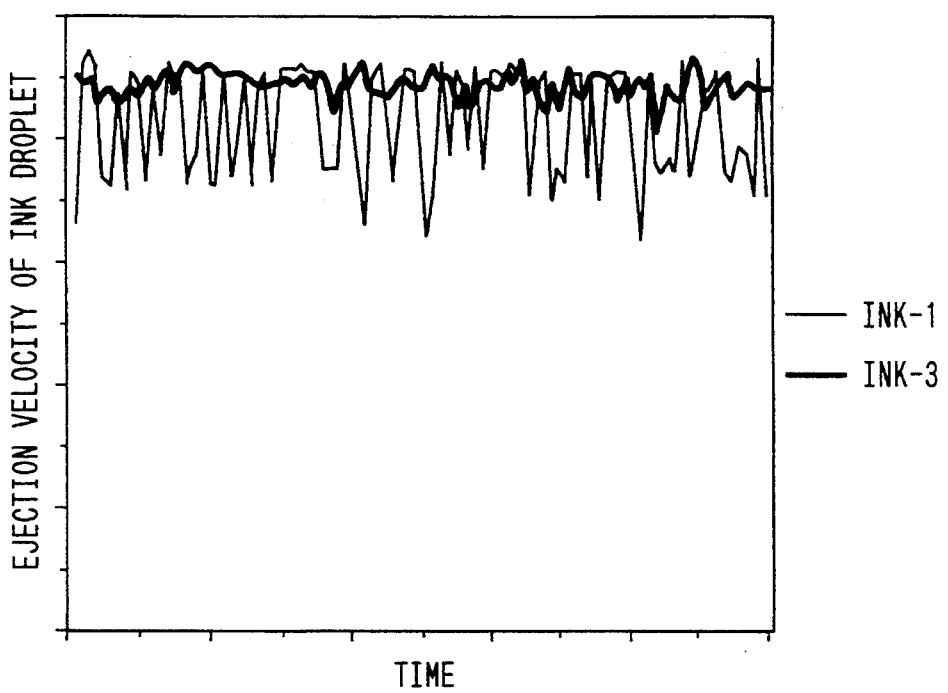
FIGS. 5A and 5B are graphs illustrating the measurement results of recording properties of the inks in the ink-jet recording head in another embodiment of the present invention.
Figure 5B:
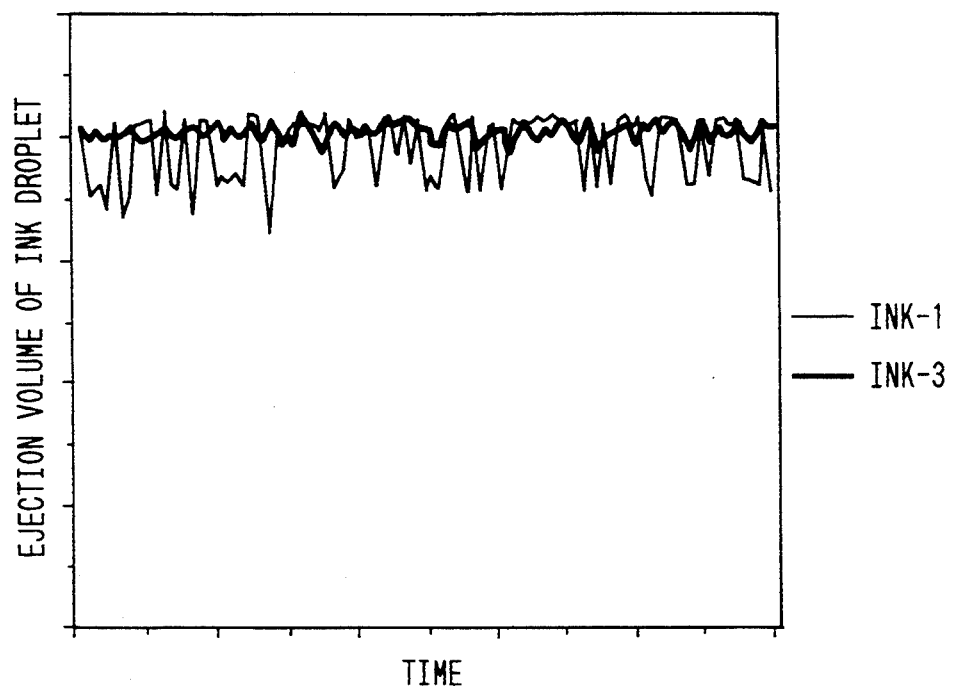

Using these inks, their recording properties, i.e., the ejection velocity and ejection volume of ink droplets ejected, were then measured. As a result, the results as to the ejection velocity of the ink droplets and the ejection volume of the ink droplets as illustrated in FIGS. 5A and 5B, respectively, were obtained. It was found from the results that Ink-3 is narrower in scattering of measured values on both ejection velocity of the ink droplets and ejection volume of the ink droplets than Ink-1. Namely, it was found that Ink-3 is still stabler in recording properties than Ink-1.

The determination of water contained in Ink-1 and Ink-3 was conducted by NMR. As a result, the number of molecules forming a cluster of water in Ink-1 was found to be 10, while the number of molecules forming a cluster of water in Ink-3 was 6.

From the above, it was able to be confirmed that when the number of molecules forming a cluster of water is controlled to about 6 by applying electric energy and further magnetic energy, the size and shape of the bubble formed on the heater can be more stabilized, and stable recording properties can hence be always provided.

EXAMPLE 3

Water A prepared by filtering through a hollow yarn membrane and applying electric energy and Water B not so treated were provided to prepare Ink-4 and Ink-5, respectively.

| Ink-4: | |
| --- | --- |
| Diethylene glycol | 10.0 parts |
| Ethylene glycol | 15.5 parts |
| Water A | 69.5 parts |
| Urea | 2.5 parts |
| C.I. Direct Black 154 | 2.5 parts. |

Ink-5

The same components as in Ink-4 except that Water A was changed to Water B were used to prepare Ink-5.

Each of Ink-4 and Ink-5 obtained by mixing the above respective components was charged in the ink-jet recording head illustrated in FIG. 1 and then a recording signal was applied to the heater 5, thereby observing the bubbling state of the ink on the heater 5 from above the heater 5. As a result, the bubbling state for Ink-4 and the bubbling state for Ink-5 as illustrated in FIGS. 6A and 6B, respectively, were observed.

Figure 6A:
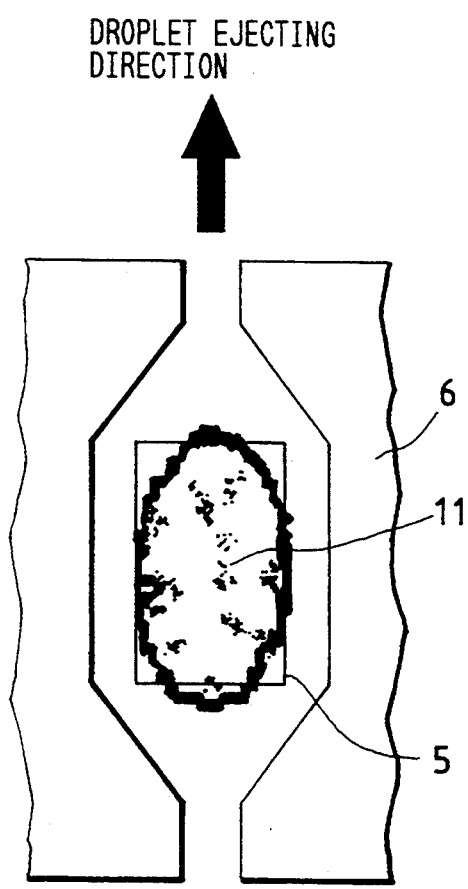
FIGS. 6A and 6B are top views illustrating the bubbling state of inks on a heater in an ink flow path of the ink-jet recording head in a further embodiment of the present invention.
Figure 6B:
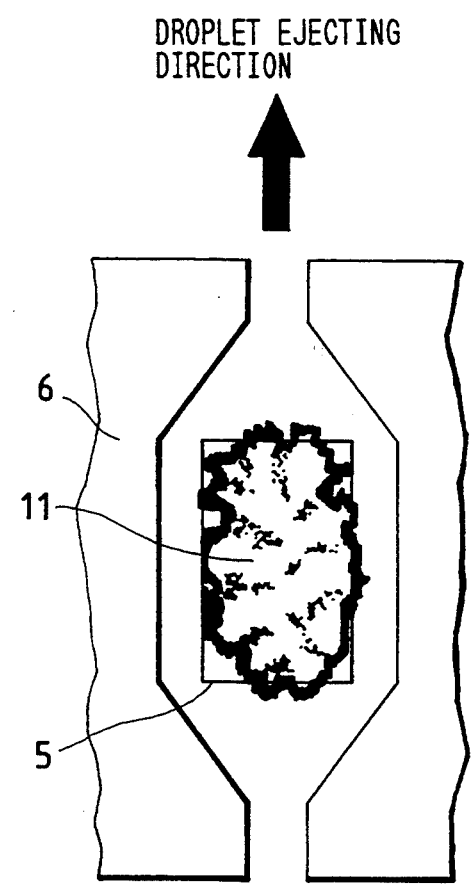
Figure 7A:
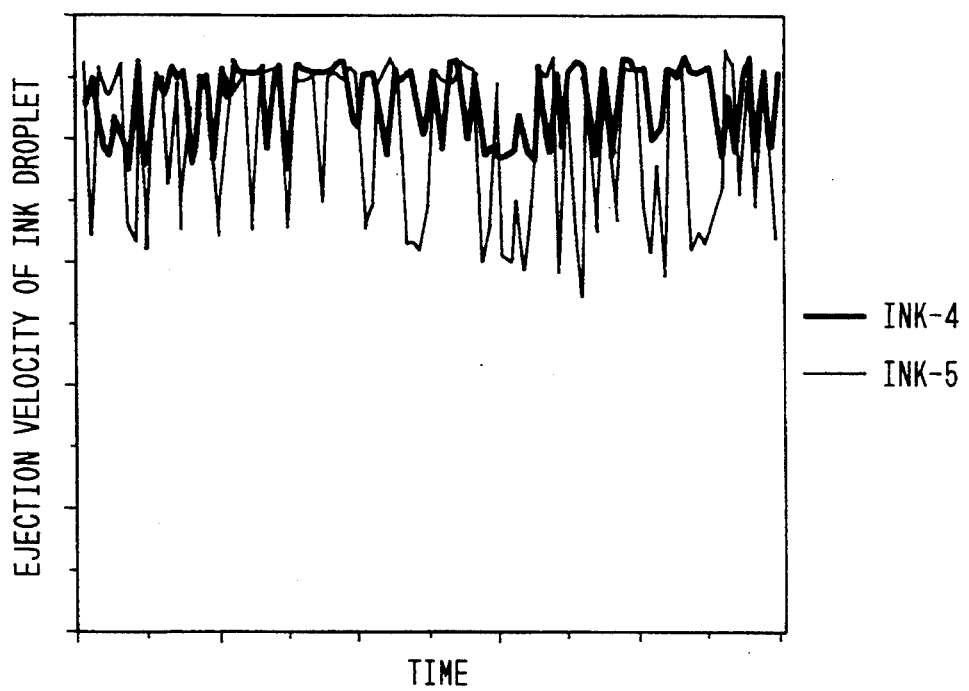
FIGS. 7A and 7B are graphs illustrating the measurement results of recording properties of the inks in the ink-jet recording head in the further embodiment of the present invention.
Figure 7B:
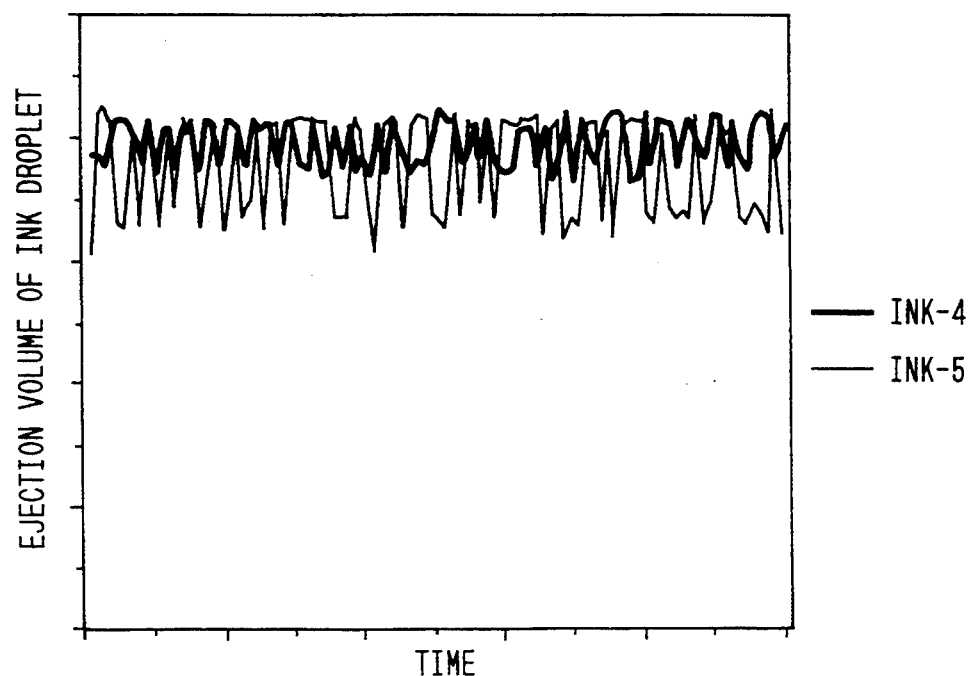

In the drawings, the bubbling states shown in FIGS. 6A and 6B are observational results at the time the shape of the bubble formed after applying the recording signal to the heater 5 has become the biggest. From the comparison of the bubbling state for Ink-4 shown in FIG. 6A with the bubbling state for Ink-5 shown in FIG. 6B, it was found that the shape of the bubble formed in the bubbling state for Ink-4 is stabler than that in the bubbling state for Ink-5. Namely, it was found that Ink-4 is stabler in recording properties than Ink-5o Using these inks, their recording properties, i.e., the ejection velocity and ejection volume of ink droplets ejected, were then measured. As a result, the results as to the ejection velocity of the ink droplets and the ejection volume of the ink droplets as illustrated in FIGS. 7A and 7B, respectively, were obtained. It was found from the results that Ink-4 is narrower in scattering of measured values on both ejection velocity of the ink droplets and ejection volume of the ink droplets than Ink-5. Namely, it was found that Ink-4 is stabler in recording properties than Ink-5.

The determination of Water A and Water B was conducted by NMR. As a result, the number of molecules forming a cluster of Water A was found to be 9, while the number of molecules forming a cluster of Water B was 13.

From the above, it was able to be confirmed that when the number of molecules forming a cluster of water is controlled to 10 or less by filtering through the hollow yarn membrane and applying electric energy, the size and shape of the bubble formed on the heater can be stabilized, and stable recording properties can hence be always provided.

EXAMPLE 4

Water A used in Example 3 and Water C prepared by filtering through a hollow yarn membrane, applying electric energy and further applying magnetic energy were provided to prepare Ink-6 and Ink-7, respectively.

| Ink-6: | |
| --- | --- |
| Diethylene glycol | 10.0 parts |
| Ethylene glycol | 15.5 parts |
| Water A | 70.5 parts |
| Urea | 1.5 parts |
| C.I. Direct Red 227 | 2.5 parts. |
| Ink-7: | |
| Diethylene glycol | 10.0 parts |
| Ethylene glycol | 15.5 parts |
| Water C | 70.5 parts |
| Urea | 1.5 parts |
| C.I. Direct Red 227 | 2.5 parts. |

Each of Ink-6 and Ink-7 obtained by mixing the above respective components was charged in the ink-jet recording head illustrated in FIG. 1 and then a recording signal was applied to the heater 5, thereby observing the bubbling state of the ink on the heater 5 from above the heater 5. As a result, the bubbling state for Ink-6 and the bubbling state for Ink-7 as illustrated in FIGS. 8A and 8B, respectively, were observed.

Figure 8A:
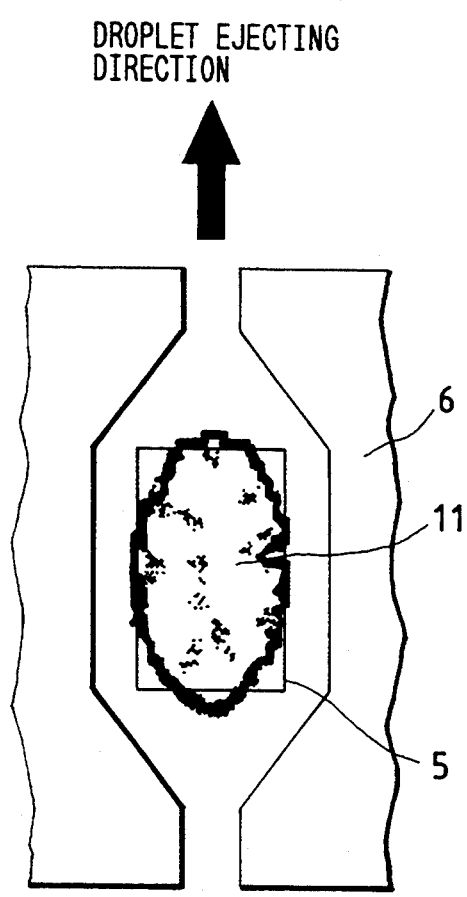
FIGS. 8A and 8B are top views illustrating the bubbling state of inks on a heater in an ink flow path of the ink-jet recording head in a still further embodiment of the present invention.
Figure 8B:
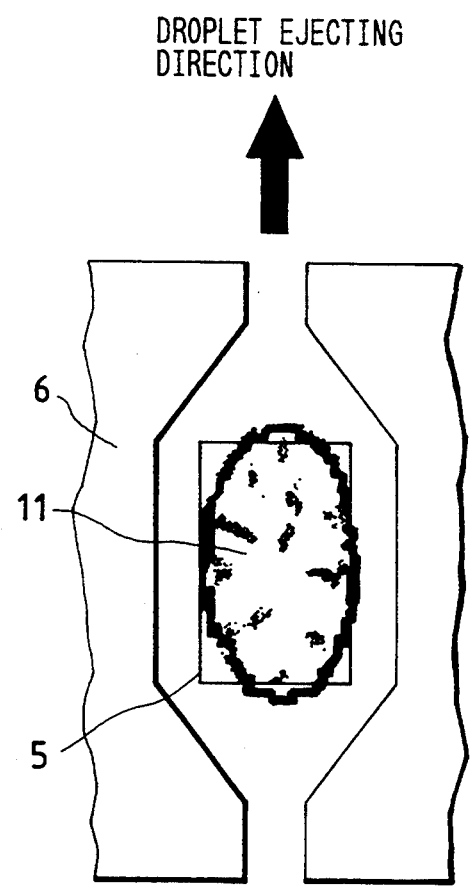

In the drawings, the bubbling states shown in FIGS. 8A and 8B are observational results at the time the shape of the bubble formed after applying the recording signal to the heater 5 has become the biggest. From the comparison of the bubbling state for Ink-6 shown in FIG. 8A with the bubbling state for Ink-7 shown in FIG. 8B, it was found that the shape of the bubble formed in the bubbling state for Ink-7 is still stabler than that in the bubbling state for Ink-6.

Namely, it was found that Ink-7 is still stabler in recording properties than Ink-6.

Figure 9A:
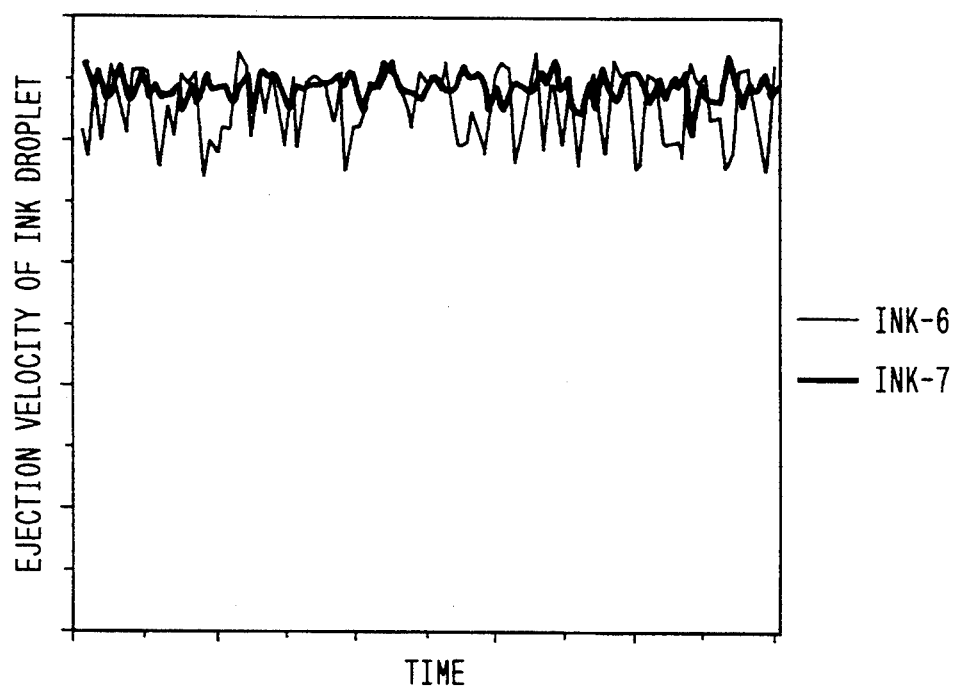
FIGS. 9A and 9B are graphs illustrating the measurement results of recording properties of the inks in the ink-jet recording head in the still further embodiment of the present invention.
Figure 9B:
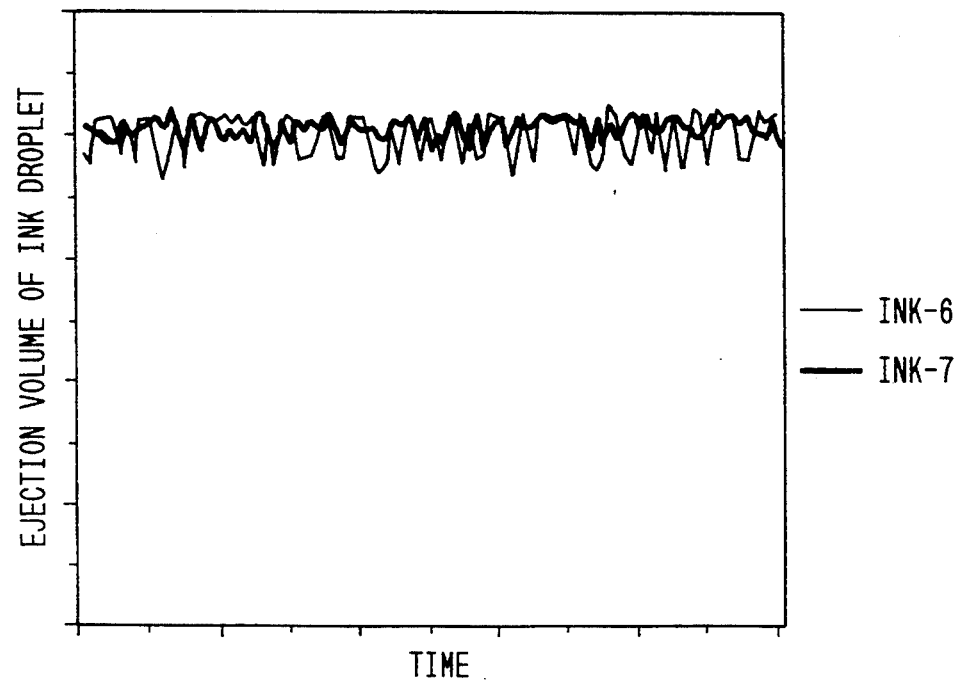

Using these inks, their recording properties, i.e., the ejection velocity and ejection volume of ink droplets ejected, were then measured. As a result, the results as to the ejection velocity of the ink droplets and the ejection volume of the ink droplets as illustrated in FIGS. 9A and 9B, respectively, were obtained. It was found from the results that Ink-7 is narrower in scattering of measured values on both ejection velocity of the ink droplets and ejection volume of the ink droplets than Ink-6.

Namely, it was found that Ink-7 is still stabler in recording properties than Ink-6.

The determination of Water A and Water C was conducted by NMR. As a result, the number of molecules forming a cluster of Water A was found to be 9, while the number of molecules forming a cluster of Water C was 6.

From the above, it was able to be confirmed that when the number of molecules forming a cluster of water is controlled to about 6 by filtering through the hollow yarn membrane, applying electric energy and further applying magnetic energy, the size and shape of the bubble formed on the heater can be more stabilized, and stable recording properties can hence be always provided.

EXAMPLE 5

Water D prepared by passing through a continuous electrolytic water generator (Ange, trade name, manufactured by Nippon Intec K.K.) and Water E not so treated were provided to prepare Ink-8 and Ink-9, respectively.

| Ink-8: | |
|---|---|
| Thiodiglycol | 10.0 parts |
| Diethylene glycol | 10.0 parts |
| Ethylene glycol | 5.0 parts |
| Water D | 72.5 parts |
| C.I. Direct Blue 86 | 2.5 parts. |
| Ink-9: | |
| Thiodiglycol | 10.0 parts |
| Diethylene glycol | 10.0 parts |
| Ethylene glycol | 5.0 parts |
| Water E | 72.5 parts |
| C.I. Direct Blue 86 | 2.5 parts. |

Each of Ink-8 and Ink-9 obtained by mixing the above respective components was charged in the ink-jet recording head illustrated in FIG. 1 and then a recording signal was applied to the heater 5, thereby observing the bubbling state of the ink on the heater 5 from above the heater 5. As a result, the bubbling state for Ink-8 and the bubbling state for Ink-9 as illustrated in FIGS. 10A and 10B, respectively, were observed.

Figure 10A:
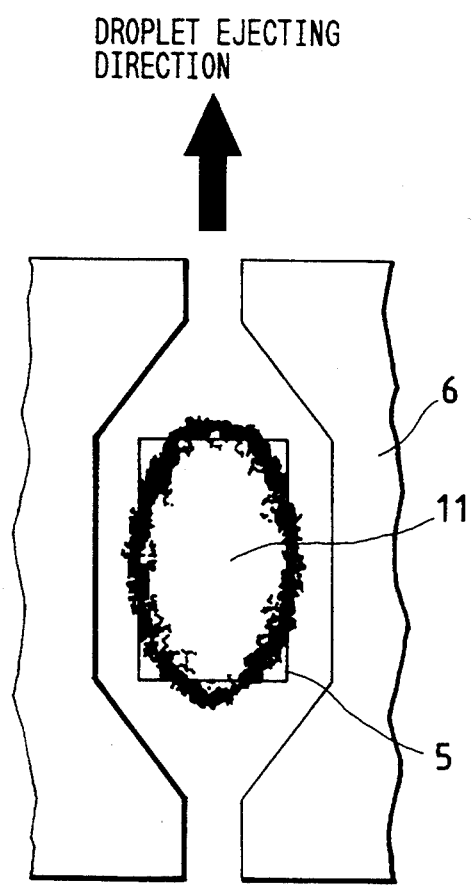
FIGS. 10A and 10B are top views illustrating the bubbling state of inks on a heater in an ink flow path of the ink-jet recording head in a yet still further embodiment of the present invention.
Figure 10B:
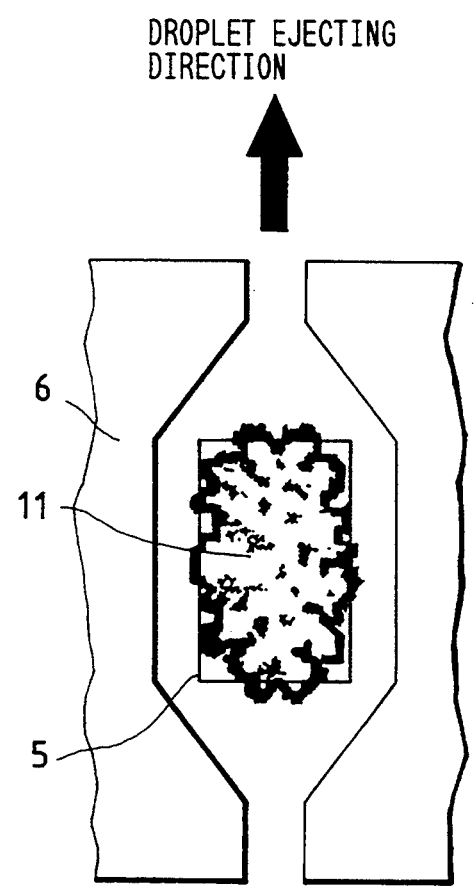

In the drawings, the bubbling states shown in FIGS. 10A and 10B are observational results at the time the shape of the bubble formed after applying the recording signal to the heater 5 has become the biggest. From the comparison of the bubbling state for Ink-8 shown in FIG. 10A with the bubbling state for Ink-9 shown in FIG. 10B, it was found that the shape of the bubble formed in the bubbling state for Ink-8 is stabler than that in the bubbling state for Ink-9. Namely, it was found that Ink-8 is stabler in recording properties than Ink-9.

Figure 11A:
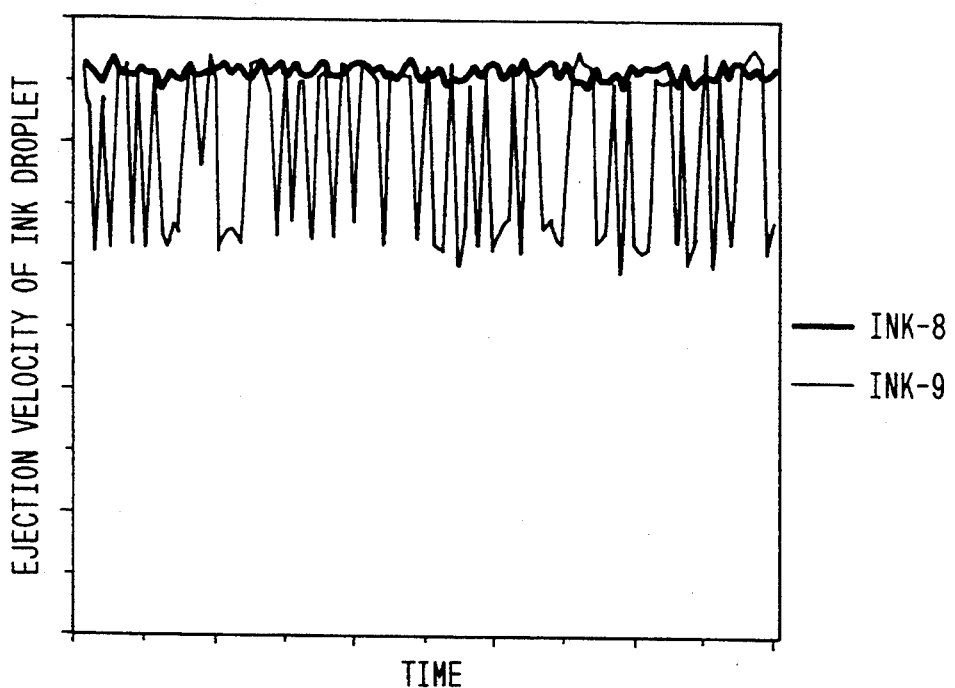
FIGS. 11A and 11B are graphs illustrating the measurement results of recording properties of the inks in the ink-jet recording head in the yet still further embodiment of the present invention.
Figure 11B:
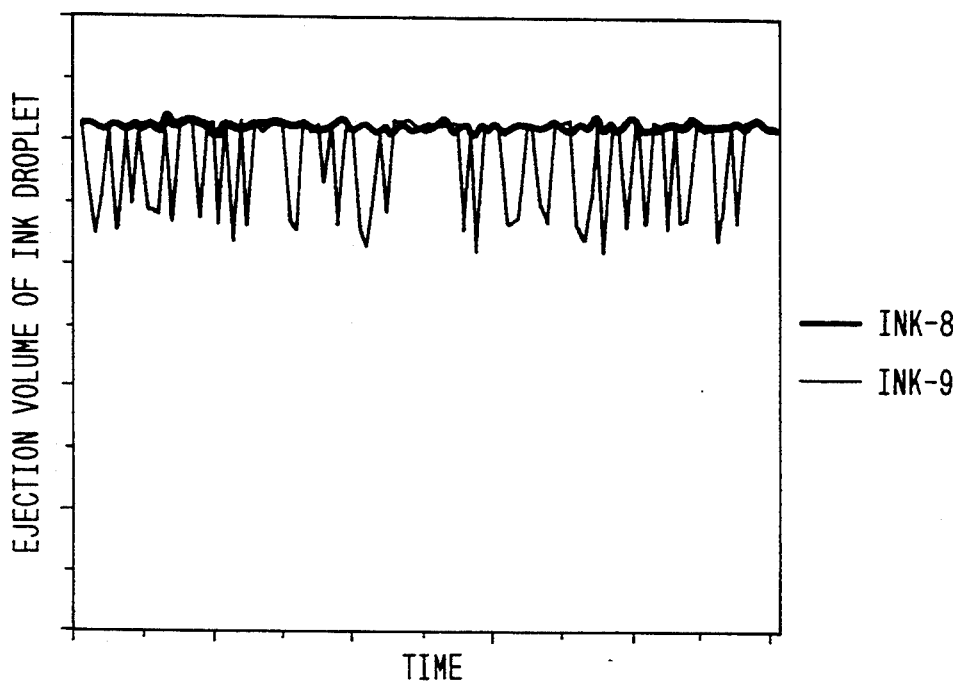

Using these inks, their recording properties, i.e., the ejection velocity and ejection volume of ink droplets ejected, were then measured. As a result, the results as to the ejection velocity of the ink droplets and the ejection volume of the ink droplets as illustrated in FIGS. 11A and 11B, respectively, were obtained. It was found from the results that Ink-8 is narrower in scattering of measured values on both ejection velocity of the ink droplets and ejection volume of the ink droplets than Ink-9. Namely, it was found that Ink-8 is stabler in recording properties than Ink-9.

The determination of Water D and Water E was conducted by NMR. As a result, the number of molecules forming a cluster of Water D was found to be 5, while the number of molecules forming a cluster of Water E was 14.

From the above, it was able to be confirmed that when the number of molecules forming a cluster of electrolytic water is controlled to 10 or less by causing to pass through a continuous electrolytic water generator (Ange, trade name, manufactured by Nippon Intec K.K.), the size and shape of the bubble formed on the heater can be stabilized, and stable recording properties can hence be always provided.

According to the first aspect of the present invention, as described above, a bubble formed on the heater according to every recording signal can be always kept to uniform size and shape so far as an ink caused to undergo change of state by thermal energy comprises a coloring material and a liquid medium dissolving or dispersing the coloring material therein, and the liquid medium comprises at least one solvent containing clusters the number of molecules of which is not less than 1, but not more than 10. Therefore, there can be provided an ink, which always permits the stabilization of recording properties of an ink droplet ejected according to every recording signal to keep the quality of recorded images at a high level, and an ink-jet recording method and instruments making use of such an ink.

EXAMPLE 6

| Ink-10: | |
|---|---|
| C.I. Direct Black 154 | 2.5 parts |
| Diethylene glycol | 10.0 parts |
| Ethylene glycol | 15.5 parts |
| Water | 72.0 parts |
| Total | 100.0 parts. |
| Ink-11: | |
| C.I. Direct Black 154 | 2.5 parts |
| Diethylene glycol | 10.0 parts |
| Ethylene glycol | 15.5 parts |
| Water | 67.0 parts |
| Ethanol | 5.0 parts |
| Total | 100.0 parts. |

To each of Ink-10 and Ink-11 obtained by mixing under stirring the above respective components, 100 kHz/100 W of ultrasonic energy was applied for 10 minutes to make the bonding state of the molecules of water and the like microscopically uniform, thereby dispersing them. The thus-obtained ink was charged in the ink-jet recording head illustrated in FIG. 1 and then a recording signal was applied to the heater 5, thereby observing the bubbling state of the ink on the heater 5 from above the heater 5. As a result, the bubbling state for Ink-10 and the bubbling state for Ink-11 as illustrated in FIGS. 12A and 12B, respectively, were observed. In the drawings, the bubbling states shown in FIGS. 12A and 12B are observational results at the time the shape of the bubble formed after applying the recording signal to the heater 5 has become the biggest. From the comparison of the bubbling state for Ink-10 shown in FIG. 12A with the bubbling state for Ink-11 shown in FIG. 12B, it was found that the shape of the bubble formed in the bubbling state for Ink-11 is stabler than that in the bubbling state for Ink-10.

Figure 13A:
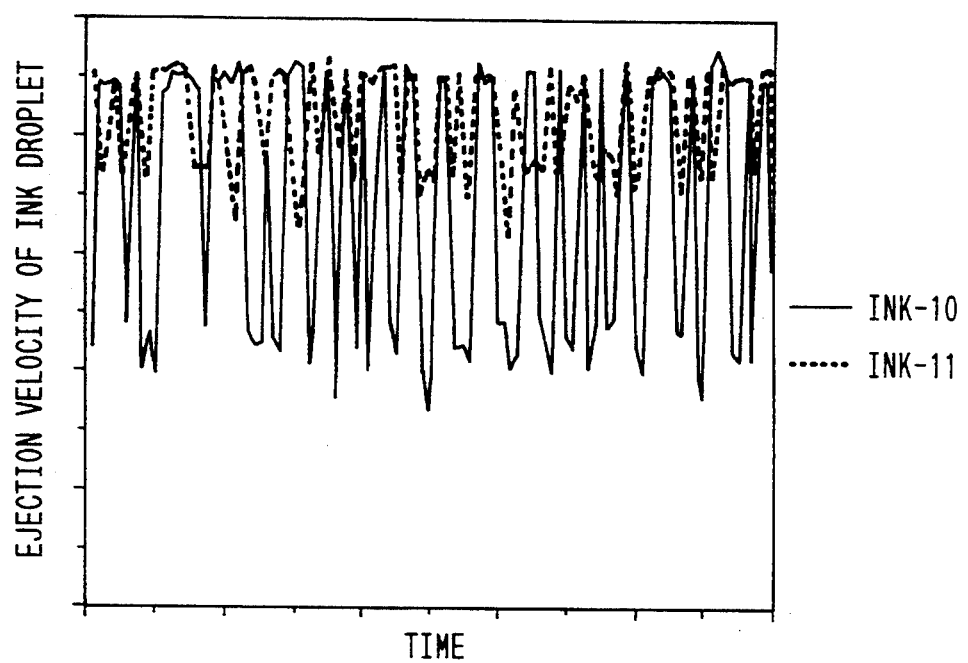
FIGS. 13A and 13B are graphs illustrating the measurement results of recording properties of the inks in the ink-jet recording head in the yet still further embodiment of the present invention.
Figure 13B:
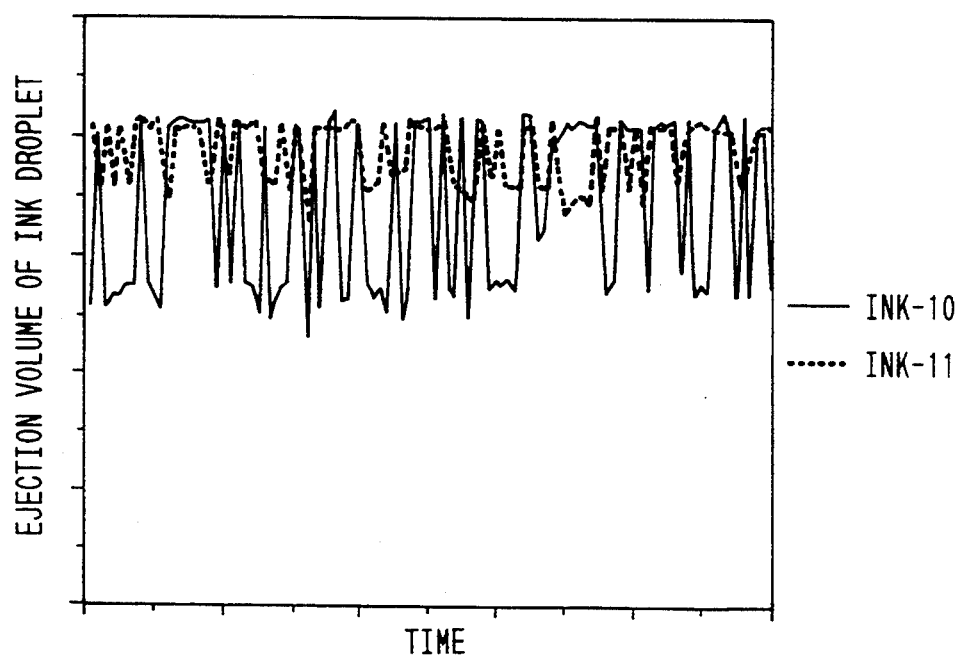

Using these inks, their recording properties, i.e., the ejection velocity and ejection volume of ink droplets ejected, were then measured. As a result, the results as to the ejection velocity of the ink droplets and the ejection volume of the ink droplets as illustrated in FIGS. 13A and 13B, respectively, were obtained. It was found from the results that Ink-11 is narrower in scattering of measured values on both ejection velocity of the ink droplets and ejection volume of the ink droplets than Ink-10. Namely, it was found that Ink-11 is stabler in recording properties than Ink-10.

From the above, it was able to be confirmed that when an ink was prepared by adding a monohydric alcohol to its components and applying ultrasonic energy to the resultant mixture, the size and shape of the bubble formed on the heater can be stabilized, and stable recording properties can hence be always provided.

EXAMPLE 7

| Ink-12: | |
| --- | --- |
| C.I. Direct Blue 86 | 2.5 parts |
| Thiodiglycol | 10.0 parts |
| Ethylene glycol | 5.0 parts |
| Water | 77.5 parts |
| Ethanol | 5.0 parts |
| Total | 100.0 parts. |
| Ink-13: | |
| C.I. Direct Blue 86 | 2.5 parts |
| Thiodiglycol | 10.0 parts |
| Ethylene glycol | 5.0 parts |
| Water | 72.5 parts |
| Ethanol | 10.0 parts |
| Total | 100.0 parts. |

To each of Ink-12 and Ink-13 obtained by mixing under stirring the above respective components, 100 kHz/100 W of ultrasonic energy was applied for 10 minutes to make the bonding state of the molecules of water and the like microscopically uniform. The thus-obtained ink was charged in the ink-jet recording head illustrated in FIG. 1 to apply a recording signal to the heater 5, thereby observing the bubbling state of the ink on the heater 5 from above the heater 5. As a result, the bubbling state for Ink-12 and the bubbling state for Ink-13 as illustrated in FIGS. 14A and 14B, respectively, were observed. In the drawings, the bubbling states shown in FIGS. 14A and 14B are observational results at the time the shape of the bubble formed after applying the recording signal to the heater 5 has become the biggest. From the comparison of the bubbling state for Ink-12 shown in FIG. 14A with the bubbling state for Ink-13 shown in FIG. 14B, it was found that the shape of the bubble formed in the bubbling state for Ink-13 is stabler than that in the bubbling state for Ink-12.

Figure 15A:
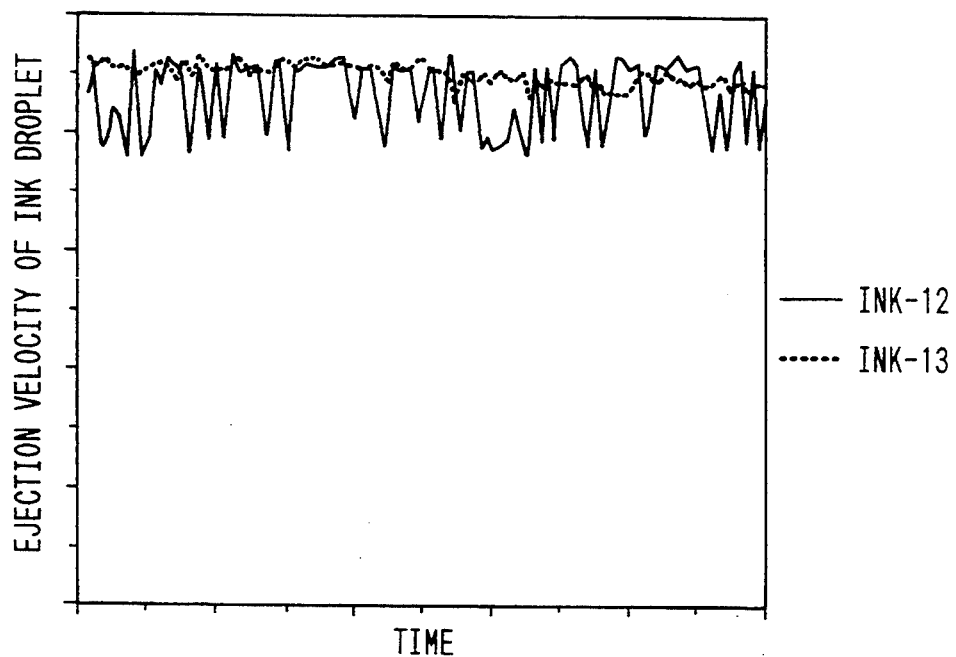
FIGS. 15A and 15B are graphs illustrating the measurement results of recording properties of the inks in the ink-jet recording head in the yet still further embodiment of the present invention.
Figure 15B:
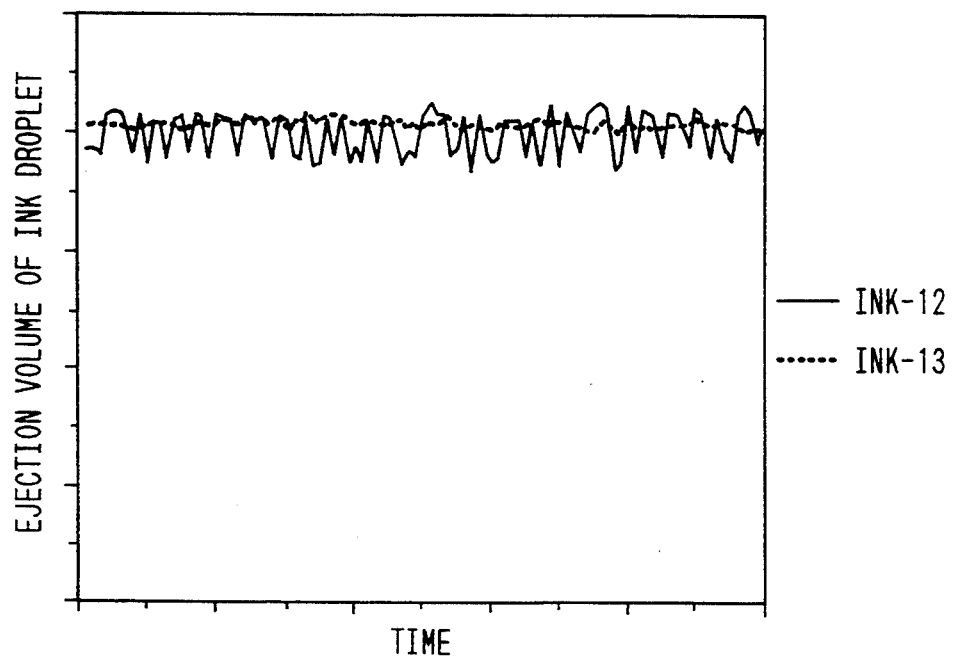

Using these inks, their recording properties, i.e., the ejection velocity and ejection volume of ink droplets ejected, were then measured. As a result, the results as to the ejection velocity of the ink droplets and the ejection volume of the ink droplets as illustrated in FIGS. 15A and 15B, respectively, were obtained. It was found from the results that Ink-13 is narrower in scattering of measured values on both ejection velocity of the ink droplets and ejection volume of the ink droplets than Ink-12. Namely, it was found that Ink-13 is still stabler in recording properties than Ink-12.

EXAMPLE 8

| Ink-14: | |
| --- | --- |
| C.I. Direct Blue 86 | 2.5 parts |
| Diethylene glycol | 15.0 parts |
| Diethylene glycol monomethyl ether | 5.5 parts |
| Water | 77.0 parts |
| Total | 100.0 parts. |
| Ink-15: | |

-continued

| C.I. Direct Blue 86 | 2.5 parts |
| --- | --- |
| Diethylene glycol | 15.0 parts |
| Diethylene glycol monomethyl ether | 5.5 parts |
| Water | 74.0 parts |
| 1-Butanol | 3.0 parts |
| Total | 100.0 parts. |

Figure 16A:
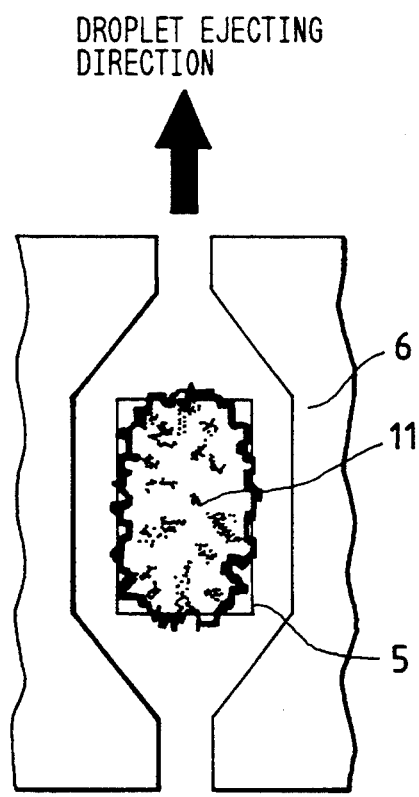
FIGS. 16A and 16B are top views illustrating the bubbling state of inks on a heater in an ink flow path of the ink-jet recording head in a yet still further embodiment of the present invention.
Figure 16B:
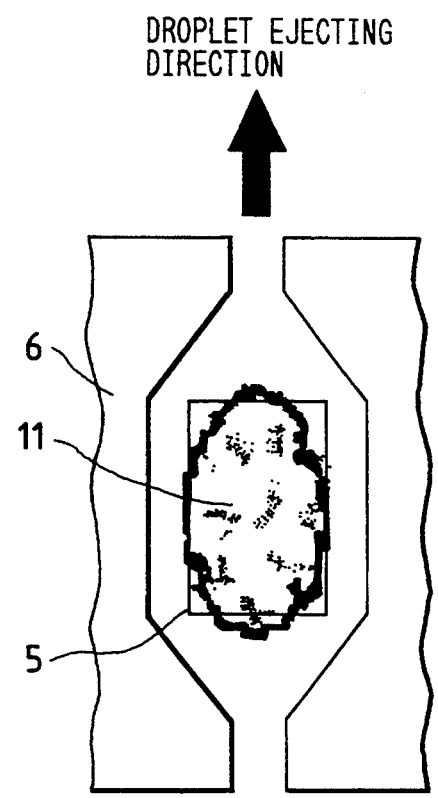

To each of Ink-14 and Ink-15 obtained by mixing under stirring the above respective components, 100 kHz/100 W of ultrasonic energy was applied for 10 minutes to make the bonding state of the molecules of water and the like microscopically uniform, thereby dispersing them. The thus-obtained ink was charged in the ink-jet recording head illustrated in FIG. 1 and then a recording signal was applied to the heater 5, thereby observing the bubbling state of the ink on the heater 5 from above the heater 5. As a result, the bubbling state for Ink-14 and the bubbling state for Ink-15 as illustrated in FIGS. 16A and 16B, respectively, were observed. In the drawings, the bubbling states shown in FIGS. 16A and 16B are observational results at the time the shape of the bubble formed after applying the recording signal to the heater 5 has become the biggest. From the comparison of the bubbling state for Ink-14 shown in FIG. 16A with the bubbling state for Ink-15 shown in FIG. 16B, it was found that the shape of the bubble formed in the bubbling state for Ink-15 is stabler than that in the bubbling state for Ink-14.

Figure 17A:
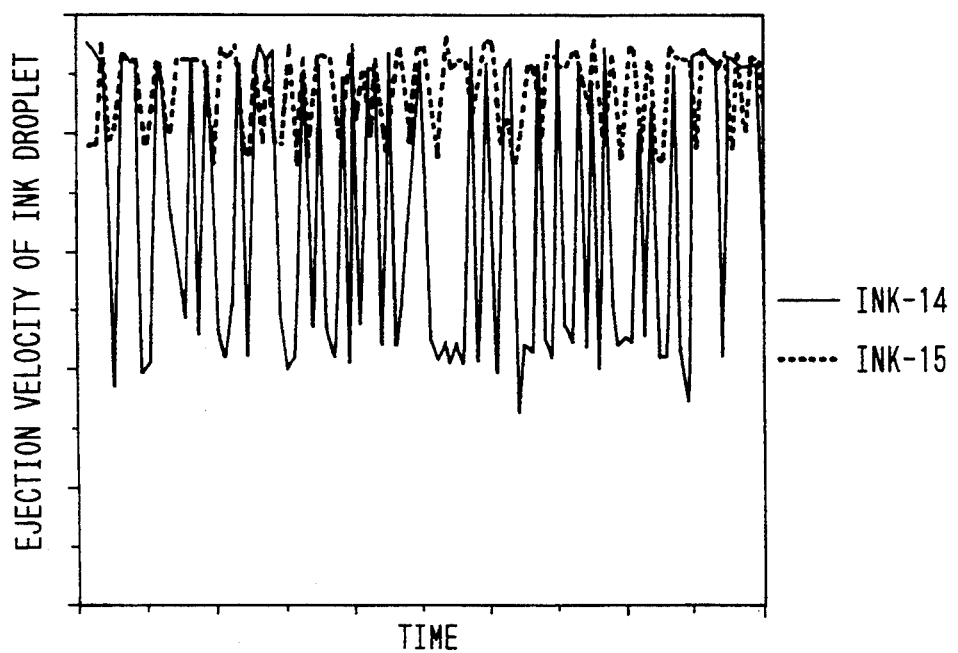
FIGS. 17A and 17B are graphs illustrating the measurement results of recording properties of the inks in the ink-jet recording head in the yet still further embodiment of the present invention.
Figure 17B:
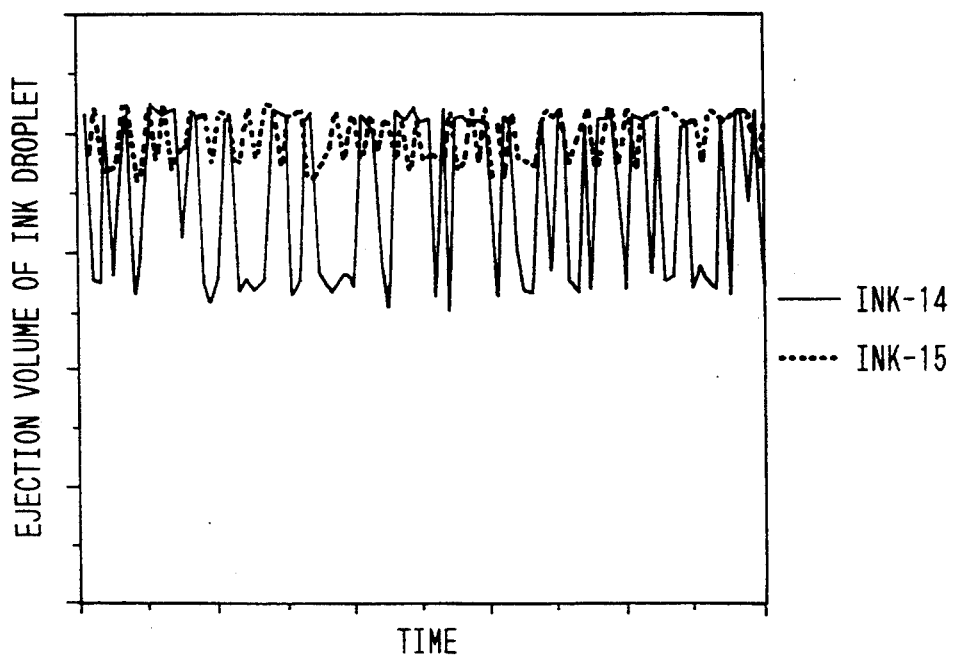

Using these inks, their recording properties, i.e., the ejection velocity and ejection volume of ink droplets ejected, were then measured. As a result, the results as to the ejection velocity of the ink droplets and the ejection volume of the ink droplets as illustrated in FIGS. 17A and 17B, respectively, were obtained. It was found from the results that Ink-15 is narrower in scattering of measured values on both ejection velocity of the ink droplets and ejection volume of the ink droplets than Ink-14. Namely, it was found that Ink-15 is stabler in recording properties than Ink-14.

EXAMPLE 9

| Ink-16: | |
| --- | --- |
| C.I. Food Black 2 | 2.5 parts |
| Urea | 2.5 parts |
| Thiodiglycol | 10.0 parts |
| Diethylene glycol | 10.0 parts |
| Water | 75.0 parts |
| Total | 100.0 parts. |
| Ink-17: | |
| C.I. Food Black 2 | 2.5 parts |
| Urea | 2.5 parts |
| Thiodiglycol | 10.0 parts |
| Diethylene glycol | 10.0 parts |
| Water | 70.0 parts |
| Ethanol | 5.0 parts |
| Total | 100.0 parts. |

Figure 18A:
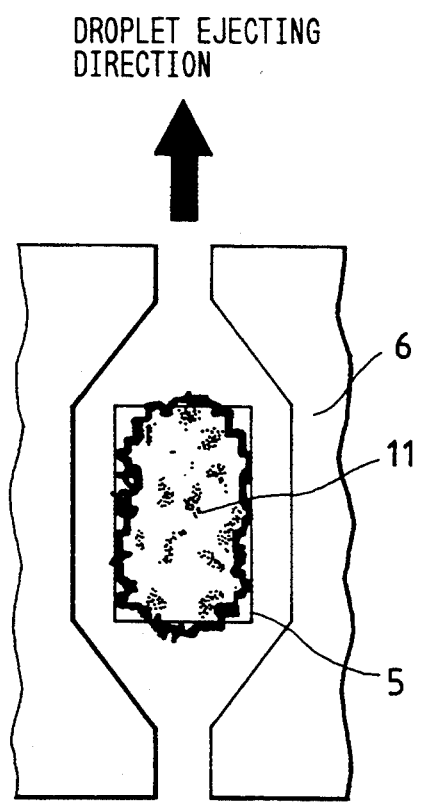
FIGS. 18A and 18B are top views illustrating the bubbling state of inks on a heater in an ink flow path of the ink-jet recording head in a yet still further embodiment of the present invention.
Figure 18B:
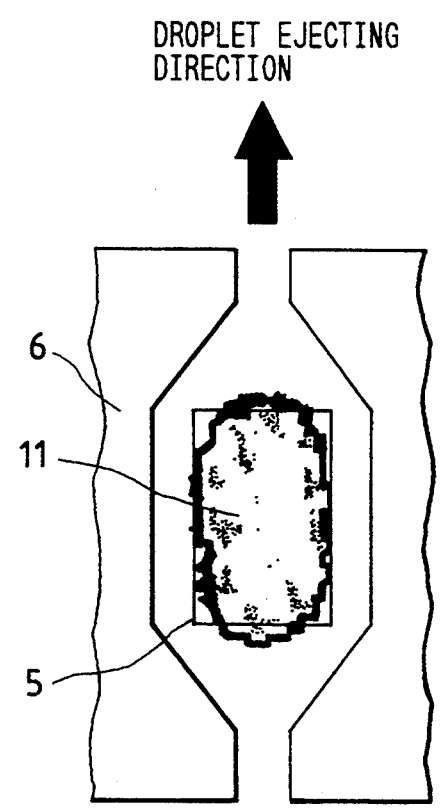

To each of Ink-16 and Ink-17 obtained by mixing under stirring the above respective components, 100 kHz/100 W of ultrasonic energy was applied for 20 minutes to make the bonding state of the molecules of water and the like microscopically uniform, thereby dispersing them. The thus-obtained ink was charged in the ink-jet recording head illustrated in FIG. 1 and then a recording signal was applied to the heater 5, thereby observing the bubbling state of the ink on the heater 5 from above the heater 5. As a result, the bubbling state for Ink-16 and the bubbling state for Ink-17 as illustrated in FIGS. 18A and 18B, respectively, were observed. In the drawings, the bubbling states shown in FIGS. 18A and 18B are observational results at the time the shape of the bubble formed after applying the recording signal to the heater 5 has become the biggest. From the comparison of the bubbling state for Ink-16 shown in FIG. 18A with the bubbling state for Ink-17 shown in FIG. 18B, it was found that the shape of the bubble formed in the bubbling state for Ink-17 is stabler than that in the bubbling state for Ink-16.

Figure 19A:
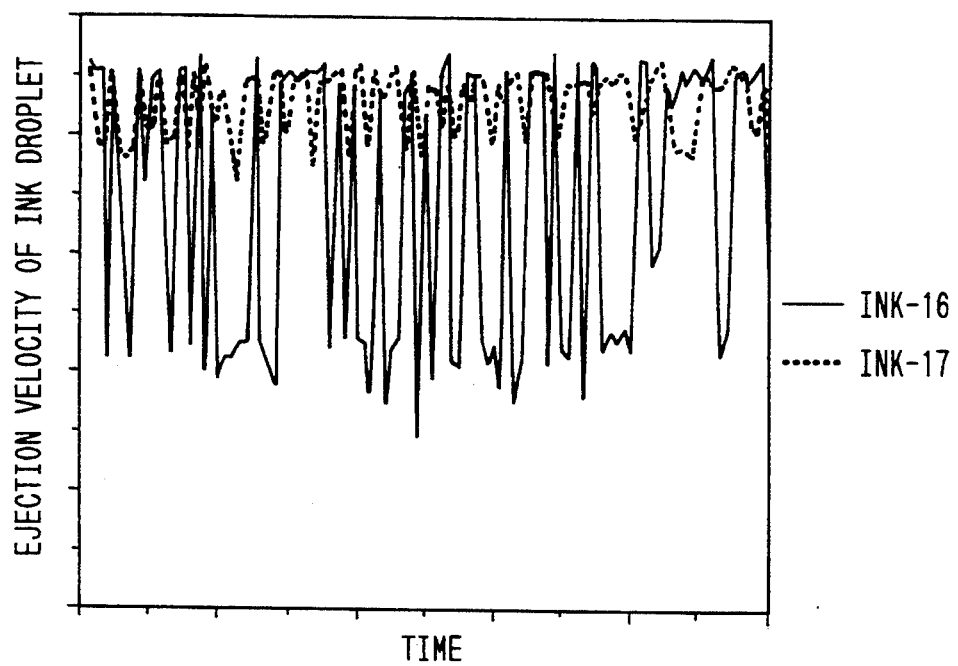
FIGS. 19A and 19B are graphs illustrating the measurement results of recording properties of the inks in the ink-jet recording head in the yet still further embodiment of the present invention.
Figure 19B:
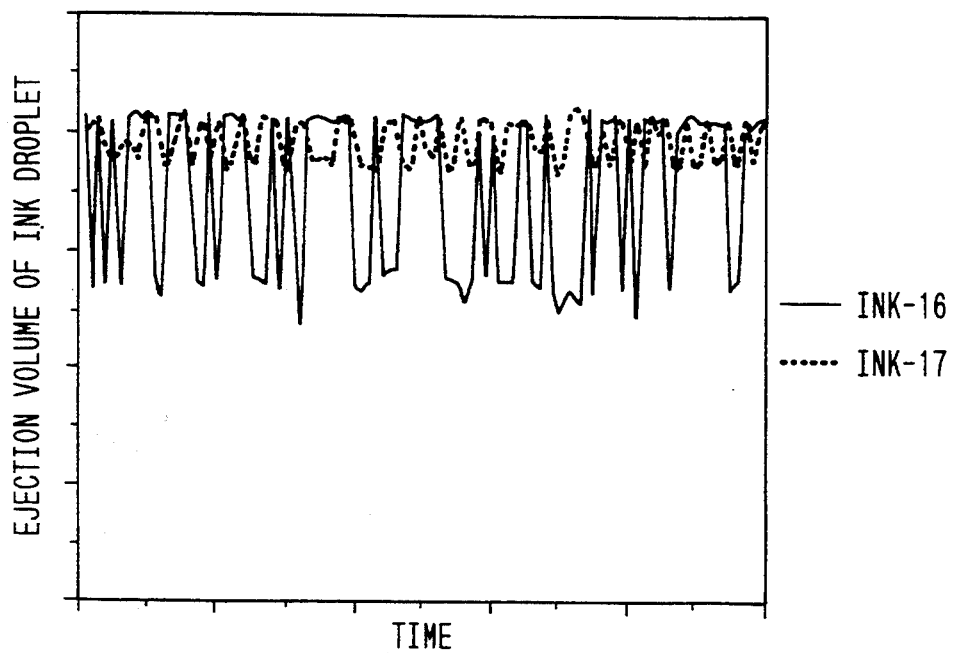

Using these inks, their recording properties, i.e., the ejection velocity and ejection volume of ink droplets ejected, were then measured. As a result, the results as to the ejection velocity of the ink droplets and the ejection volume of the ink droplets as illustrated in FIGS. 19A and 19B, respectively, were obtained. It was found from the results that Ink-17 is narrower in scattering of measured values on both ejection velocity of the ink droplets and ejection volume of the ink droplets than Ink-16. Namely, it was found that Ink-17 is stabler in recording properties than Ink-16.

According to the second aspect of the present invention, as described above, a bubble formed on a heater according to every recording signal can be always kept to uniform size and shape so far as an ink caused to undergo change of state by thermal energy, comprising a coloring material and a liquid medium containing at least monohydric alcohol, and applied with ultrasonic energy is used. Therefore, there can be provided inks, which always permit the stabilization of recording properties of an ink droplet ejected according to every recording signal to keep the quality of recorded images a high level, a production method of such an ink, and an ink-jet recording method making use of such an ink.

EXAMPLE 10

| Ink-18: | |
|---|---|
| C.I. Direct Black 154 | 2.5 parts |
| Diethylene glycol | 10.0 parts |
| Ethylene glycol | 15.5 parts |
| 1-Butyl alcohol | 3.0 parts |
| Water | 69.0 parts |
| Total | 100.0 parts. |

To Ink-18 obtained by mixing under stirring the above components, ultrasonic energy was applied to make the bonding state of the molecules of water and the like microscopically uniform, thereby preparing an ink.

Figure 22:
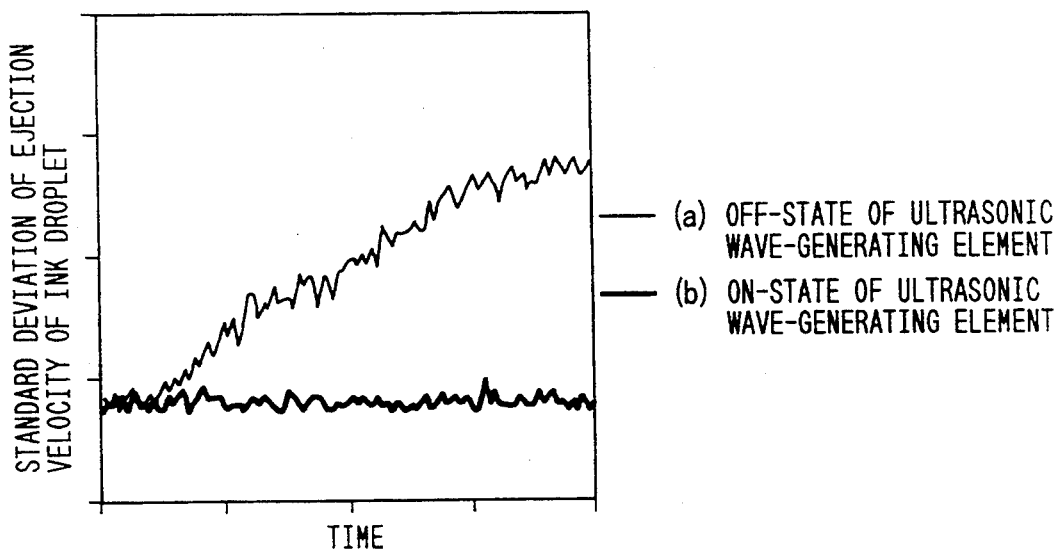
FIG. 22 is a graph illustrating the measurement results of the change of standard deviation with time as to the ejection velocity of droplets of an experimental ink by means of the recording head illustrated in FIG. 20.
Figure 23:
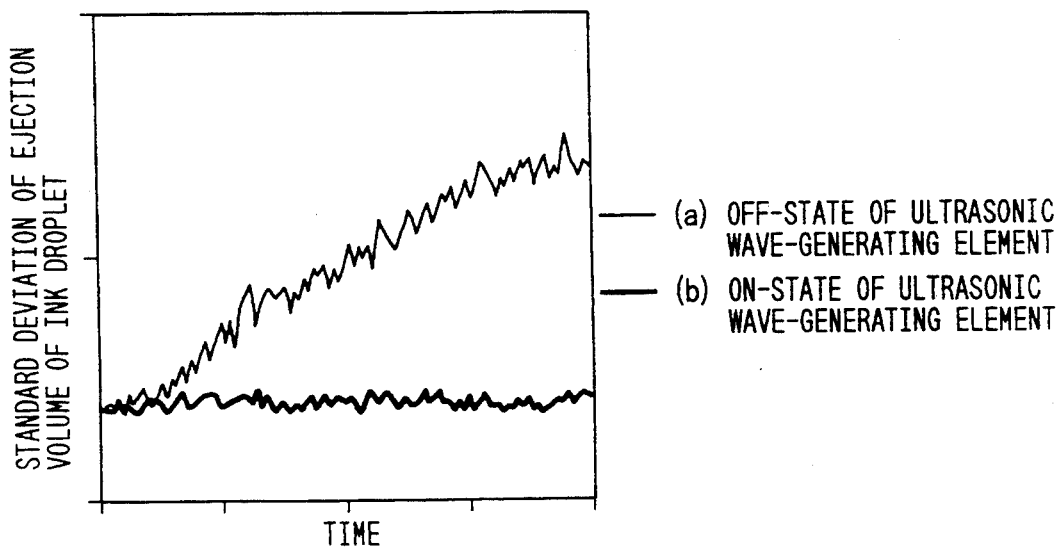
FIG. 23 is a graph illustrating the measurement results of the change of standard deviation with time as to the ejection volume of droplets of the experimental ink by means of the recording head illustrated in FIG. 20.

Right after the preparation of Ink-18, the ink was charged in the ink-jet recording head illustrated in FIG. 20 and then a recording signal to the heater 25, thereby determining its recording properties at the time droplets of the ink were continuously ejected from the ejection orifice 23, particularly, the ejection velocity and ejection volume of the ink droplets ejected, at certain time intervals. As a result, the measurement results of the change of standard deviation with time as to the ejection velocity of the ink droplets and the ejection volume of the ink droplets as indicated by (a) in FIGS. 22 and 23, respectively, were obtained.

Besides, right after the preparation of Ink-18, the ink was charged in the ink-jet recording head illustrated in FIG. 20 to actuate the ultrasonic wave-generating element 29 provided on the head base 22, thereby applying ultrasonic energy to an ink portion 20 in the common ink chamber 27. Thereafter, a recording signal was applied to the heater 25, thereby determining the recording properties of the ink at the time droplets of the ink were continuously ejected from the ejection orifice 23, particularly, the ejection velocity and ejection volume of the ink droplets ejected, at certain time intervals. As a result, the measurement results of the change of standard deviation with time as to the ejection velocity of the ink droplets and the ejection volume of the ink droplets as indicated by (b) in FIGS. 22 and 23, respectively, were obtained.

It was found from the results that with respect to the recording properties of Ink-18, although the respective standard deviations are substantially equal right after the preparation of the ink irrespective of whether the ultrasonic wave-generating element 29 is actuated or not, the standard deviations where the ultrasonic wave-generating element 29 is actuated remain substantially kept at the initial values even when the time goes on compared with the change of the standard deviations with time where the ultrasonic wave-generating element 29 is not actuated. This means that the properties inherent in Ink-18 can be kept at their initial levels by actuating the ultrasonic wave-generating element 29 to apply ultrasonic energy to Ink-18. From the above, it was able to be confirmed that when ultrasonic energy is applied to Ink-18 by the ultrasonic wave-generating element 29, the recording properties of Ink-18 can be kept unchanged, namely, the quality of recorded images can be stably kept at a high level.

EXAMPLE 11

| Ink-19: | |
|---|---|
| C.I. Direct Red 227 | 2.5 parts |
| Diethylene glycol | 10.0 parts |
| Glycerol | 15.5 parts |
| Water | 72.0 parts |
| Total | 100.0 parts. |

To Ink-19 obtained by mixing under stirring the above components, electric energy was applied to make the bonding state of the molecules of water and the like microscopically uniform, thereby preparing an ink.

Figure 24:
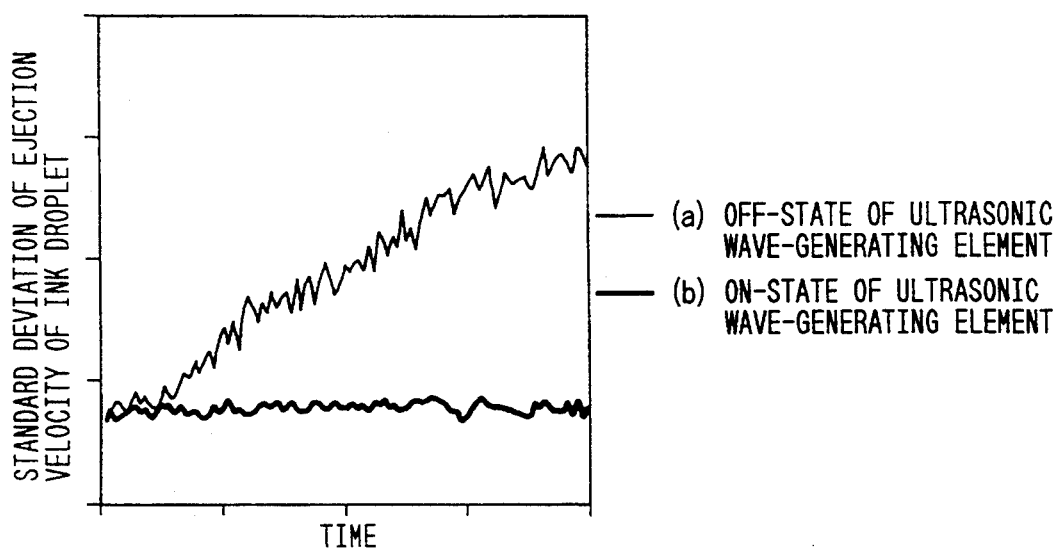
FIG. 24 is a graph illustrating the measurement results of the change of standard deviation with time as to the ejection velocity of droplets of another experimental ink by means of the recording head illustrated in FIG. 20.
Figure 25:
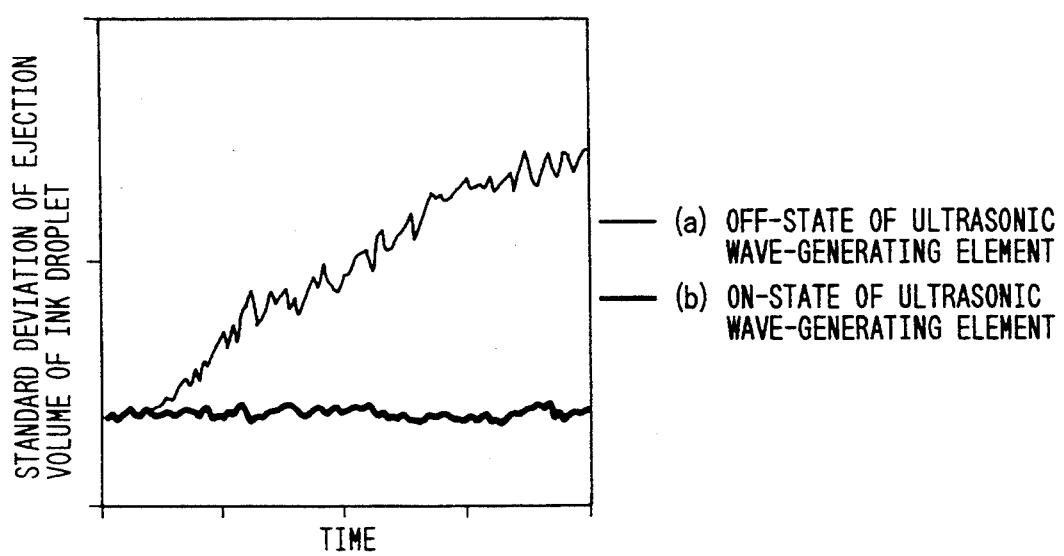
FIG. 25 is a graph illustrating the measurement results of the change of standard deviation with time as to the ejection volume of droplets of another experimental ink by means of the recording head illustrated in FIG. 20.

Right after the preparation of Ink-19, the ink was charged in the ink-jet recording head illustrated in FIG. 20 and the a recording signal was applied to the heater 25, thereby determining its recording properties at the time droplets of the ink were continuously ejected from the ejection orifice 23, particularly, the ejection velocity and ejection volume of the ink droplets ejected, at certain time intervals. As a result, the measurement results of the change of standard deviation with time as to the ejection velocity of the ink droplets and the ejection volume of the ink droplets as indicated by (a) in FIGS. 24 and 25, respectively, were obtained.

Besides, right after the preparation of Ink-19, the ink was charged in the ink-jet recording head illustrated in FIG. 20 to actuate the ultrasonic wave-generating element 29 provided on the head base 22, thereby applying ultrasonic energy to an ink portion 20 in the common ink chamber 27. Thereafter, a recording signal was applied to the heater 25, thereby determining the recording properties of the ink at the time droplets of the ink were continuously ejected from the ejection orifice 23, particularly, the ejection velocity and ejection volume of the ink droplets ejected, at certain time intervals. As a result, the measurement results of the change of standard deviation with time as to the ejection velocity of the ink droplets and the ejection volume of the ink droplets as indicated by (b) in FIGS. 24 and 25, respectively, were obtained.

It was found from the results that with respect to the recording properties of Ink-19, although the respective standard deviations are substantially equal right after the preparation of the ink irrespective of whether the ultrasonic wave-generating element 29 is actuated or not, the standard deviations where the ultrasonic wave-generating element 29 is actuated remain substantially kept at the initial values even when the time goes on compared with the change of the standard deviations with time where the ultrasonic wave-generating element 29 is not actuated. This means that the properties inherent in Ink-19 can be kept at their initial levels by actuating the ultrasonic wave-generating element 29 to apply ultrasonic energy to Ink-19. From the above, it was able to be confirmed that when ultrasonic energy is applied to Ink-19 by the ultrasonic wave-generating element 29, the recording properties of Ink-19 can be kept unchanged, namely, the quality of recorded images can be stably kept at a high level.

EXAMPLE 12

| Ink-20: | |
| --- | --- |
| C.I. Direct Blue 86 | 2.5 parts |
| Thiodiglycol | 10.0 parts |
| Ethylene glycol | 5.0 parts |
| 1-Butyl alcohol | 3.0 |
| Water | 79.5 parts |
| Total | 100.0 parts. |

To Ink-20 obtained by mixing under stirring the above components, ultrasonic energy was applied to make the bonding state of the molecules of water and the like microscopically uniform, thereby preparing an ink.

Figure 28:
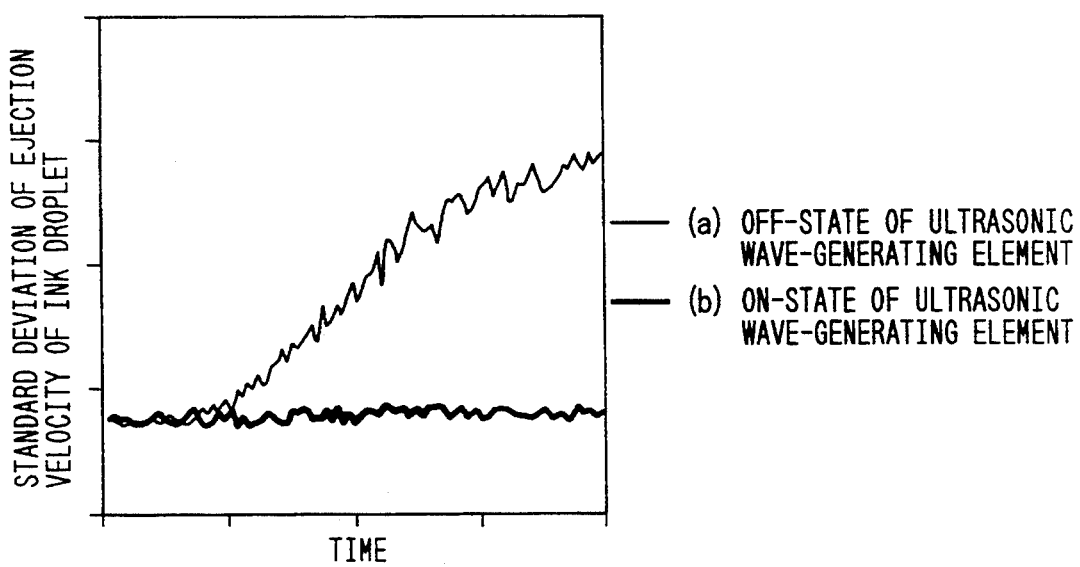
FIG. 28 is a graph illustrating the measurement results of the change of standard deviation with time as to the ejection velocity of droplets of a further experimental ink by means of the recording head illustrated in FIG. 26.
Figure 29:
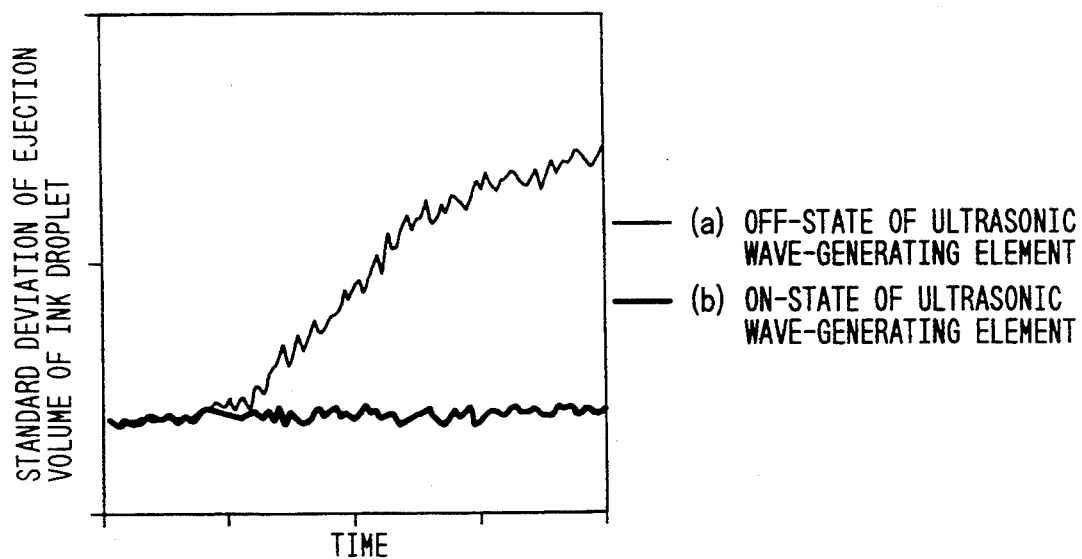
FIG. 29 is a graph illustrating the measurement results of the change of standard deviation with time as to the ejection volume of droplets of the further experimental ink by means of the recording head illustrated in FIG. 26.

Right after the preparation of Ink-20, the ink was charged in the ink-jet recording head illustrated in FIG. 26 and then a recording signal was applied to the heater 35, thereby determining its recording properties at the time droplets of the ink were continuously ejected from the ejection orifice 33, particularly, the ejection velocity and ejection volume of the ink droplets ejected, at certain time intervals. As a result, the measurement results of the change of standard deviation with time as to the ejection velocity of the ink droplets and the ejection volume of the ink droplets as indicated by (a) in FIGS. 28 and 29, respectively, were obtained.

Besides, right after the preparation of Ink-20, the ink was charged in the ink-jet recording head illustrated in FIG. 26 to actuate the ultrasonic wave-generating element 39 provided on the head base 32, thereby applying ultrasonic energy to an ink portion 20 in the common ink chamber 37. Thereafter, a recording signal was applied to the heater 35, thereby determining the recording properties of the ink at the time droplets of the ink were continuously ejected from the ejection orifice 33, particularly, the ejection velocity and ejection volume of the ink droplets ejected, at certain time intervals. As a result, the measurement results of the change of standard deviation with time as to the ejection velocity of the ink droplets and the ejection volume of the ink droplets as indicated by (b) in FIGS. 28 and 29, respectively, were obtained.

It was found from the results that with respect to the recording properties of Ink-20, although the respective standard deviations are substantially equal right after the preparation of the ink irrespective of whether the ultrasonic wave-generating element 39 is actuated or not, the standard deviations where the ultrasonic wave-generating element 39 is actuated remain substantially kept at the initial values even when the time goes on compared with the change of the standard deviations with time where the ultrasonic wave-generating element 39 is not actuated. This means that the properties inherent in Ink-20 can be kept at their initial levels by actuating the ultrasonic wave-generating element 39 to apply ultrasonic energy to Ink-20. From the above, it was able to be confirmed that when ultrasonic energy is applied to Ink-20 by the ultrasonic wave-generating element 39, the recording properties of Ink-20 can be kept unchanged, namely, the quality of recorded images can be stably kept at a high level.

According to the present invention, as described above, there can be provided recording heads which can always stabilize the recording properties of a droplet ejected according to every recording signal to keep the quality of recorded images at a high level for a long period of time, and recording apparatus making use of such a head.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A method for making an ink comprising:
    applying at least one of electrical energy, magnetic energy, ultrasonic energy, infrared radiation energy, shock wave energy, chemical energy, and physical energy to a solvent; and
    mixing said solvent with a liquid medium and a coloring material;
    thereby forming an ink containing a solvent having clusters composed of 1 to 10 molecules.

2. The method according to claim 1, wherein an ink containing a solvent having clusters composed of 3 to 8 molecules is formed.

3. The method according to claim 1, wherein said solvent is water.

4. The method according to claim 3, wherein said water is electrolytic water.

5. The method according to claim 1, wherein said liquid medium comprises a monohydric alcohol.

6. The method according to claim 1, wherein at least one of electrical energy, magnetic energy, and ultrasonic energy is applied.

7. An ink formed by any one of the methods according to any one of claims 1 to 6.

8. A method for making an ink comprising:
    mixing a solvent with a liquid medium to form a mixture;
    applying at least one of electrical energy, magnetic energy, ultrasonic energy, infrared radiation energy, shock wave energy, chemical energy, and physical energy to said mixture; and
    mixing said mixture with a coloring material;

thereby forming an ink containing a solvent having clusters composed of 1 to 10 molecules.

9. The method according to claim 8, wherein an ink containing a solvent having clusters composed to 3 to 8 molecules is formed.

10. The method according to claim 8, wherein said solvent is water.

11. The method according to claim 10, wherein said water is electrolytic water.

12. The method according to claim 8, wherein said liquid medium comprises a monohydric alcohol.

13. The method according to claim 8, wherein at least one of electrical energy, magnetic energy, and ultrasonic energy is applied.

14. An ink formed by any one of the methods according to any one of claims 8 to 13.

15. A method for making an ink comprising:
mixing a solvent with a liquid medium and a coloring material to form a mixture; and
applying at least one of electrical energy, magnetic energy, ultrasonic energy, infrared radiation energy, shock wave energy, chemical energy, and physical energy to said mixture;
thereby forming an ink containing a solvent having clusters composed of 1 to 10 molecules.

16. The method according to claim 15, wherein an ink containing a solvent having clusters composed to 3 to 8 molecules is formed.

17. The method according to claim 15, wherein said solvent is water.

18. The method according to claim 17, wherein said water is electrolytic water.

19. The method according to claim 15, wherein said liquid medium comprises a monohydric alcohol.

20. The method according to claim 15, wherein at least one of electrical energy, magnetic energy, and ultrasonic energy is applied.

21. An ink formed by any one of the methods according to any one of claims 15 to 20.

22. A method for stabilizing ejection of ink droplets comprising:
applying thermal energy to the ink according to claim 7; and
ejecting said ink as ink droplets.

23. A method for stabilizing ejection of ink droplets comprising:
applying thermal energy to the ink according to claim 14; and
ejecting said ink as ink droplets.

24. A method for stabilizing ejection of ink droplets comprising:
applying thermal energy to the ink according to claim 21; and
ejecting said ink as ink droplets.

25. An ink-jet recording method comprising:
applying thermal energy to the ink according to claim 7; and
ejecting said ink as ink droplets to a recording medium to conduct recording.

26. An ink-jet recording method comprising:
applying thermal energy to the ink according to claim 14; and
ejecting said ink as ink droplets to a recording medium to conduct recording.

27. An in-jet recording method comprising:
applying thermal energy to the ink according to claim 21; and
ejecting said ink as ink droplets to a recording medium to conduct recording.

28. A recording head comprising an ink container portion with an ink held therein, and a head from which the ink is ejected in the form of ink droplets by the action of thermal energy, wherein said ink is the ink according to claim 7.

29. An ink-jet recording apparatus equipped with the recording head according to claim 28.

30. A recording head comprising an ink container portion with an ink held therein, and a head from which the ink is ejected in the form of ink droplets by the action of thermal energy, wherein said ink is the ink according to claim 14.

31. An ink-jet recording apparatus equipped with the recording head according to claim 30.

32. A recording head comprising an ink container portion with an ink held therein, and a head from which the ink is ejected in the form of ink droplets by the action of thermal energy, wherein said ink is the ink according to claim 21.

33. An ink-jet recording apparatus equipped with the recording head according to claim 32.

34. An ink-jet recording method comprising:
applying at least one of electrical energy, magnetic energy, ultrasonic energy, infrared radiation energy, shock wave energy, chemical energy, and physical energy to an ink comprising a coloring material and a liquid medium, thereby dispersing the molecules of the liquid medium by making the bonding state of the molecules microscopically uniform; and
applying thermal energy to said ink to eject said ink as droplets on a recording medium to conduct recording.

35. A recording head comprising an ink container portion with an ink held therein, and a head for ejecting the ink in the form of ink droplets from its ejection orifice by the action of thermal energy, wherein an ink comprising a coloring material and a liquid medium the molecules of which are dispersed by making the bonding state of the molecules microscopically uniform is used as said ink, and a means for keeping the dispersed state of the liquid medium is provided in the head.

36. The recording head according to claim 35, wherein the means for keeping the dispersed state of the liquid medium is an ultrasonic wave-generating element.

37. The recording head according to claim 35, wherein the liquid medium comprises a monohydric alcohol.

38. The recording head according to claim 35, wherein the monohydric alcohol is contained in a proportion of 0.1 to 20% by weight in the ink.

39. The recording head according to claim 36, wherein the intensity of the ultrasonic energy generated by the ultrasonic wave-generating element is a sufficient intensity not to eject the ink from the ejection orifice.

40. An ink-jet recording apparatus equipped with the recording head according to any one of claims 35 to 39.

* * * * *

UNITED STATES PATENT AND TRADEMARK OFFICE
CERTIFICATE OF CORRECTION

PATENT NO. : 5,447,562
DATED : September 5, 1995
INVENTOR(S) : HIROYUKI MAEDA, et al.

It is certified that error appears in the above-indentified patent and that said Letters Patent is hereby corrected as shown below:

COLUMN 1

Line 11, "conduct" should read --conducting--.
Line 47, "than" should read --then--.
Line 60, "may" should be deleted.

COLUMN 8

Line 9, "discloses," should read --disclose,--.
Line 46, "elements" should read --element--.

COLUMN 10

Line 61, "off" should be deleted.

COLUMN 13

Line 60, "Ink-5o" should read --Ink-5.--.

COLUMN 20

Line 46, "the a" should read --then a--.

COLUMN 22

Line 32, "to the" should read --the--.

UNITED STATES PATENT AND TRADEMARK OFFICE
CERTIFICATE OF CORRECTION

PATENT NO. : 5,447,562

DATED : September 5, 1995

INVENTOR(S) : HIROYUKI MAEDA, et al.

It is certified that error appears in the above-indentified patent and that said Letters Patent is hereby corrected as shown below:

<u>COLUMN 23</u>

Line 4, "composed to" should read --composed of--.
    Line 27, "composed to" should read --composed of--.

<u>COLUMN 24</u>

Line 1, "in-jet" should read --ink-jet--.

Signed and Sealed this

Twenty-third Day of January, 1996

Attest:

BRUCE LEHMAN

*Attesting Officer*      *Commissioner of Patents and Trademarks*